(12) United States Patent
Hitschmann et al.

(10) Patent No.: US 9,339,996 B2
(45) Date of Patent: May 17, 2016

(54) DURABLE HYDROPHOBIC STRUCTURED SURFACE

(75) Inventors: Guido Hitschmann, Neuss (DE); Bernd Kuehneweg, Duesseldorf (DE)

(73) Assignee: 3M Innovative Properties Company, St. Paul, MN (US)

( * ) Notice: Subject to any disclaimer, the term of this patent is extended or adjusted under 35 U.S.C. 154(b) by 432 days.

(21) Appl. No.: 13/704,043

(22) PCT Filed: Jun. 30, 2011

(86) PCT No.: PCT/US2011/042528
§ 371 (c)(1),
(2), (4) Date: Dec. 13, 2012

(87) PCT Pub. No.: WO2012/006207
PCT Pub. Date: Jan. 12, 2012

(65) Prior Publication Data
US 2013/0101791 A1    Apr. 25, 2013

(30) Foreign Application Priority Data

Jul. 9, 2010    (EP) ..................... 10169173

(51) Int. Cl.
*D06N 7/04*    (2006.01)
*B29C 59/16*    (2006.01)
(Continued)

(52) U.S. Cl.
CPC ............... *B32B 33/00* (2013.01); *B29C 43/021* (2013.01); *B29C 59/022* (2013.01); *B29C 59/16* (2013.01);
(Continued)

(58) Field of Classification Search
None
See application file for complete search history.

(56) References Cited

U.S. PATENT DOCUMENTS

| 3,354,022 A | 11/1967 | Dettre |
| 6,465,539 B1 | 10/2002 | Weikard |

(Continued)

FOREIGN PATENT DOCUMENTS

| CA | 2260470 | 7/1999 |
| CN | 1810912 | 8/2006 |

(Continued)

OTHER PUBLICATIONS

Barthlott, et al., "Raster-Elektronenmikroskopie der Epidermis-Oberflachen von Spermatophyten" Tropische und subtropische Pflanzenwelt, ("Scanning Electron Microscopy of Epidermal Surfaces of Spermatophyta" Tropical and Subtropical Flora), vol. 19, pp. 110, (1977).

(Continued)

*Primary Examiner* — David Sample
*Assistant Examiner* — Nicole T Gugliotta
(74) *Attorney, Agent, or Firm* — Adrian L. Pishko

(57) ABSTRACT

The present invention relates to a scratch-resistant micro- and/or nanostructured surface comprising a plurality of micro-scale and/or nano-scale surface elements, said surface being essentially unchanged when being subjected to 10 rubbing cycles according to A.A.T.C.C. test method 8-1972 using a cotton cloth and a total stamp weight of 300 g, and comprising a polymeric material having 1) an elongation at break of at least 10%, 2) an irreversible relative plastic deformation (permanent set) of less than 2% and a 3) a tensile strength of at least 5 MPa. The present invention furthermore relates to a hydrophobic micro- and/or nanostructured surface comprising a plurality of micro-scale and/or nano-scale surface elements and having a static contact angle against water of at least 90, said surface comprising a polymeric material having 1) an elongation at break of at least 10%, 2) an irreversible relative plastic deformation (permanent set) of less than 2% and a 3) a tensile strength of at least 5 MPa.

8 Claims, 8 Drawing Sheets

200 μm

Figure 1A:
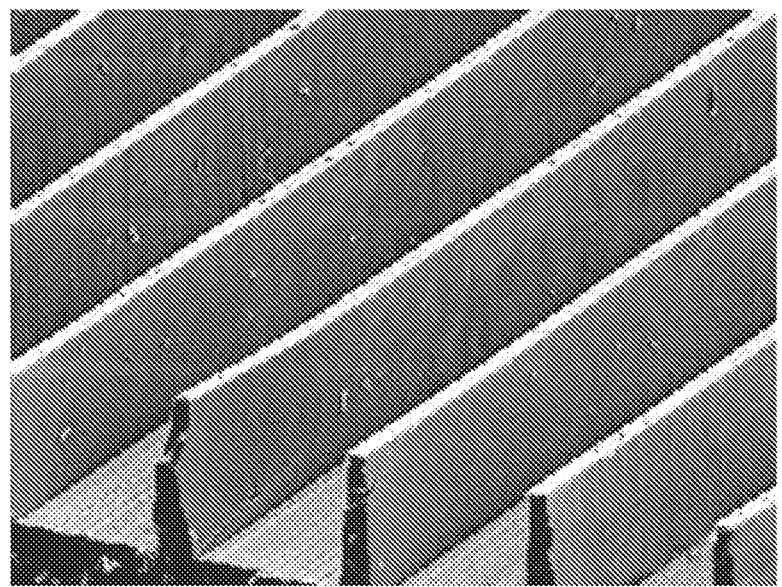

(51) Int. Cl.
  *B32B 33/00* (2006.01)
  *B29C 43/02* (2006.01)
  *B29C 59/02* (2006.01)
  *B82Y 30/00* (2011.01)
  *B29C 43/22* (2006.01)
  *B29C 35/08* (2006.01)
  *B29K 105/00* (2006.01)

(52) U.S. Cl.
  CPC ....... *B29C 43/222* (2013.01); *B29C 2035/0827* (2013.01); *B29C 2059/023* (2013.01); *B29K 2105/0002* (2013.01); *B29K 2995/0093* (2013.01); *B82Y 30/00* (2013.01); *Y10T 428/24355* (2015.01)

(56) References Cited

U.S. PATENT DOCUMENTS

| | | | |
|---|---|---|---|
| 6,641,767 | B2 | 11/2003 | Zhang |
| 6,660,363 | B1 | 12/2003 | Barthlott |
| 6,664,354 | B2 | 12/2003 | Savu |
| 7,140,812 | B2 | 11/2006 | Bryan |
| 2005/0009945 | A1* | 1/2005 | Wenning et al. .............. 522/148 |
| 2006/0237878 | A1 | 10/2006 | Vora |
| 2007/0231542 | A1 | 10/2007 | Deng |

FOREIGN PATENT DOCUMENTS

| | | |
|---|---|---|
| JP | 2009218616 | 9/2009 |
| WO | WO 99/55537 | 11/1999 |
| WO | WO 2007/011671 | 1/2007 |
| WO | WO 2011/125970 | 10/2011 |

OTHER PUBLICATIONS

Busscher, et al., "The Effect of Surface Roughness of Polymers on Measured Contact Angles of Liquids," Colloids and Surfaces, vol. 9, (1984), pp. 319-331.

B. Viel's PhD thesis titled "Strukturierte Kolloidpartikel fur ultrahydrophobe, schmutzabweisende Oberflachen" (Structure colloid particles for ultra-hydrophobic, dirt repellent surfaces), submitted with the Technical University of Darmstadt on Sep. 5, 2007 and published in Darmstadt, Germany 2008, pp. 72-74.

Wenzel, Robert, "Resistance of Solid Surfaces to Wetting by Water," Industrial and Engineering Chemistry, vol. 28, No. 8, (1936), pp. 988-994.

Cassie, et al., "Wettability of Porous Surfaces," Transactions of the Faraday Society, vol. 40, (1944), pp. 546-551.

Picard, et al., "Focused ion beam-shaped microtools for ultra-precision machining of cylindrical components," Precision Engineering, vol. 27, No. 1, (2003), pp. 59-69.

* cited by examiner

200 μm 2.00 μm

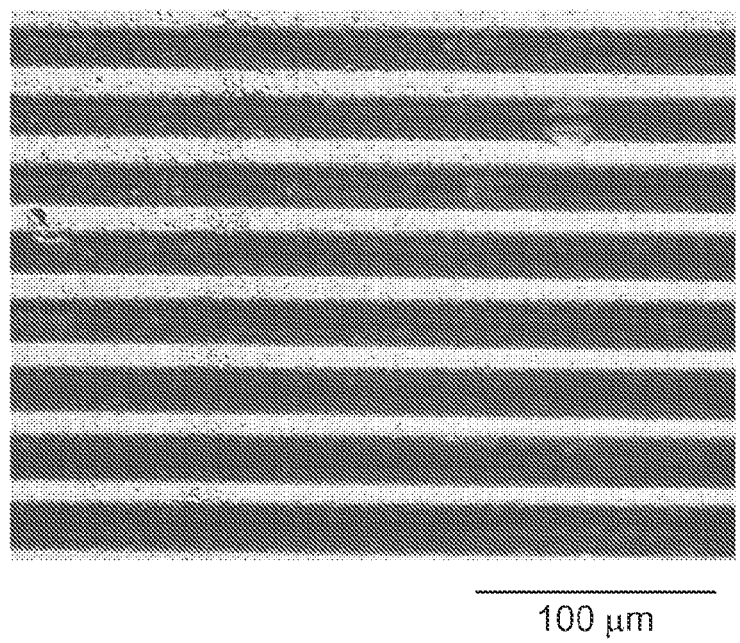
*Fig. 3a*
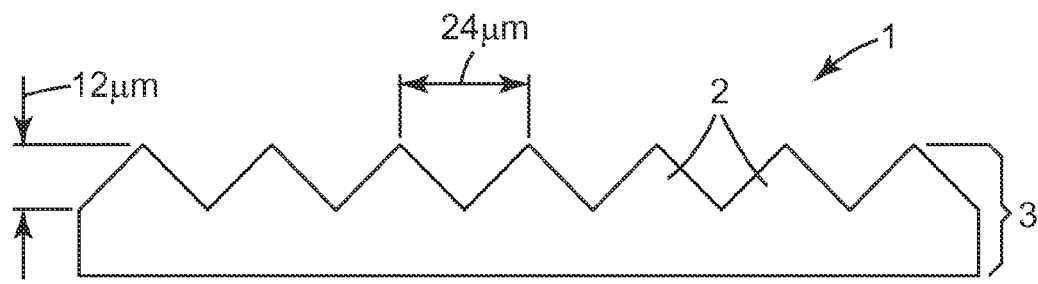
*Fig. 3b*
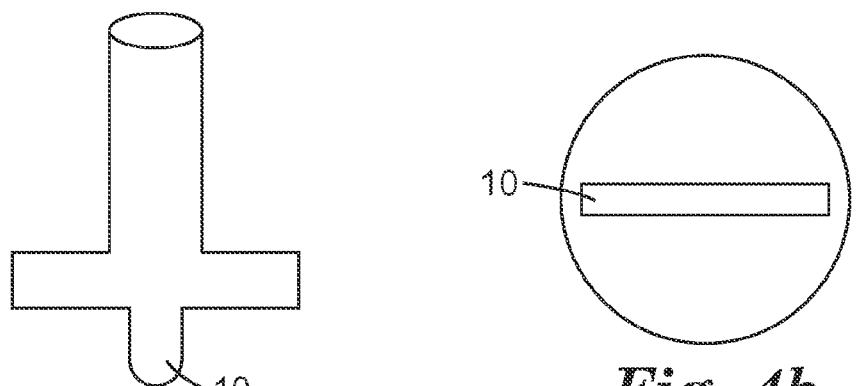
*Fig. 4a*  *Fig. 4b*

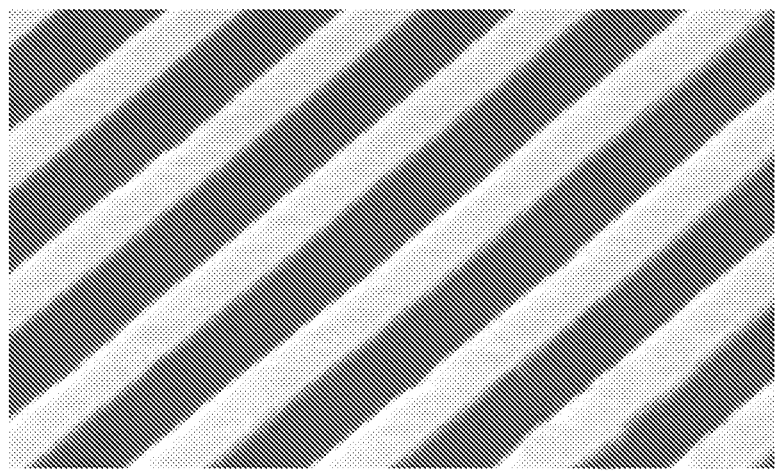
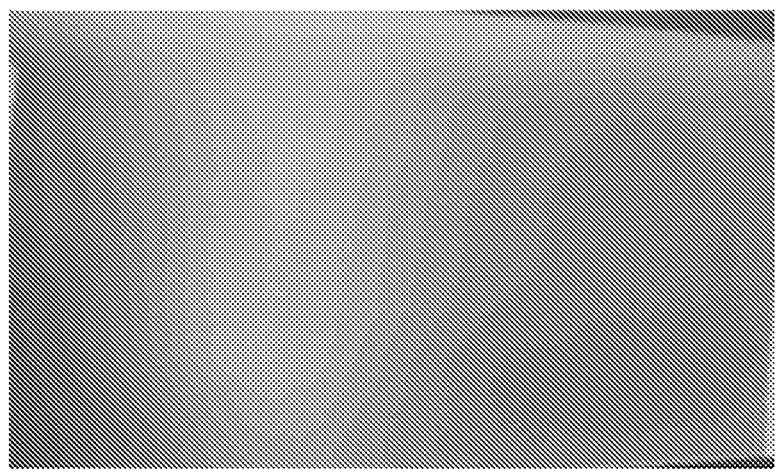
1.00 μm
*Fig. 5a*

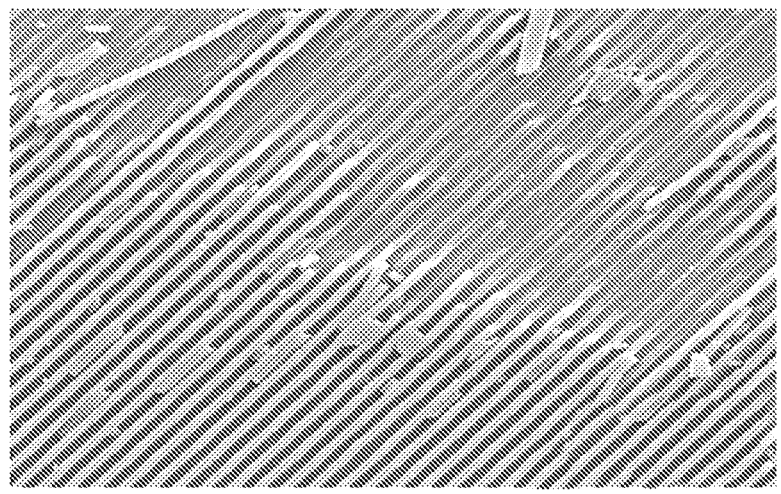
5.00 μm
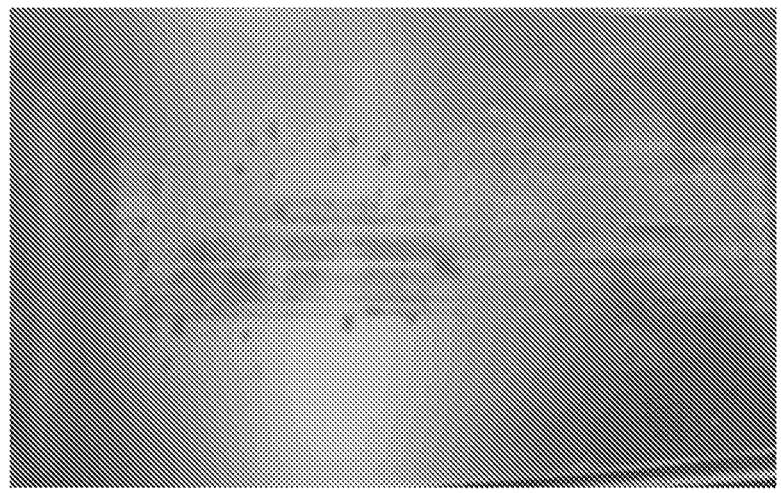
*Fig. 5b*

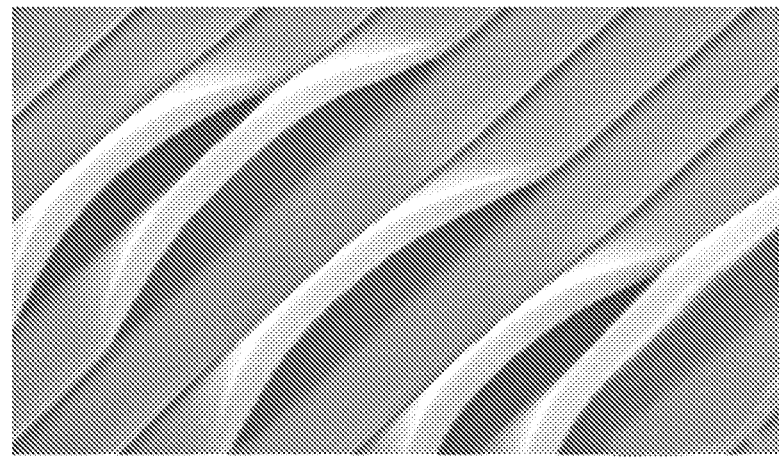
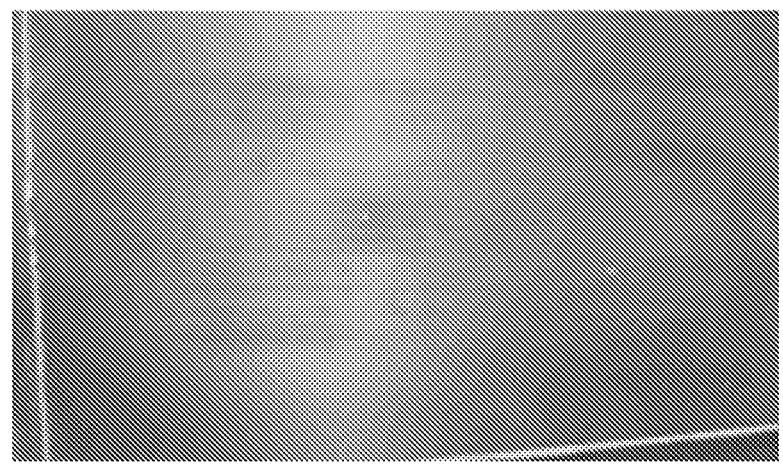
*Fig. 5c*

DURABLE HYDROPHOBIC STRUCTURED SURFACE

FIELD OF THE INVENTION

The present invention relates to a scratch-resistant structured surface comprising a plurality of micro-scale and/or nano-scale surface elements.

The present invention furthermore relates to a structured hydrophobic surface comprising a plurality of micro-scale and/or nano-scale surface elements and having a static contact angle against water of at least 90°, the surface exhibiting favourable mechanical properties and, in particular, a high durability and mechanical stress resistance.

The invention furthermore refers to a method of preparing such surfaces and to articles including films and coatings comprising such surface.

BACKGROUND

Structured surfaces comprising a plurality of micro-scale and/or nano-scale surface elements are used in a variety of technical fields and applications including, for example, optical applications and so-called self-cleaning surfaces.

Natural surfaces such as plant leaves or animal furs may exhibit self-cleaning surfaces employing the so-called *Lotus* effect to provide for water repellence. The term *Lotus* effect has been coined by botanist Wilhelm Barthlott who has conducted extensive investigations of this phenomenon since about 30 years (Barthlott, Wilhelm; Ehler, N. (1977). "Raster-Elektronenmikroskopie der Epidermis-Oberflächen von Spermatophyten". *Tropische and subtropische Pflanzenwelt* (Akad. Wiss. Lit. Mainz) 19: 110). The Lotus effect is based on the presence of micro- and/or sub-micrometer (i.e. nanometer)-sized mechanical structures on the surface which by virtue of their shape, size, and distance prevent water droplets from spreading out and from penetrating through the surface into the substance. Typical rain drops may be about 5 mm in diameter, and a surface providing a water-repellent effect exhibits a structure having surface elements which are much smaller than the size of a water droplet and typically comprise surface elements of a micrometer and/or nanometer scale. This relation between the typical sizes of a water droplet and the surface elements of a water-repellent surface tends to result in a decrease of the contact area between the water droplet and the surface. Thus wetting of the surface is minimized, and so is the holding power of the droplet to the surface. As a result, the drop tends to roll of the surface when that surface is only slightly tilted, taking loose dirt particles with it as it rolls off. This is the reason why such surfaces are often referred to as self-cleaning.

It is known that the water repellent effect of hydrophobic materials can be enhanced by employing such materials in an appropriately structured surface.

WO 96/04123 and U.S. Pat. No. 6,641,767 disclose water-repellent micro-structured surfaces comprising a low-surface-energy material.

WO 96/04,123 discloses self-cleaning surfaces comprising hydrophobic polymer materials. The surfaces exhibit artificial surface elements having a height of between 5 μm (micrometers) to 100 μm and a distance of between 5 μm to 200 μm between the elements.

U.S. Pat. No. 6,641,767 discloses a method of forming a replicate of a structured surface. The tool surfaces from which the surfaces are obtained by replication comprise a plurality of pyramidal shaped surface elements exhibiting a continuous distribution of their sizes ranging from less than 50 nm (nanometers) to greater than 1 μm. Such surface elements are obtained in U.S. Pat. No. 6,641,767 by vapour-coating deposition.

Micro- and/or nano-structured surfaces disclosed in the prior art tend to have an insufficient mechanical stability. WO 96/04,123, for example, discloses that the surfaces specified therein may not be exposed to high mechanical stresses during cleaning with rinsing water as this may polish and even out the surface elements so that the surfaces loose their self-cleaning capability. WO 96/04,123 also discusses an insufficient mechanical stability of micro- and/or nano-structured surfaces.

European patent EP 0,933,388 discloses a surface that has nano- and/or microscale surface elements having an average height of 50 nm to 10 μm and an average distance of 50 nm to 4 μm. The micro- and nano-scale surface elements are arranged as a "superstructure" on more coarse microscale surface elements having an average height of 10 μm to 1 mm (millimeter) and average spacing of 10 μm up to 1 mm. Structured surfaces of this type are generally also referred to as "structure-on-structure" (Sons) surfaces. EP 0,933,388 discloses that the SonS structure provides for an enhanced mechanical resistance when compared to non-SonS surfaces comprising micro- and nano-size surface elements. It is speculated that this results from a mechanical protection of the nano- and or micro-scale surface elements in the indentations or valleys of the micro-scale superstructure.

However, the problem how to provide an optionally hydrophobic durable structured surface comprising a plurality of micro-scale and/or nano-scale surface elements that exhibits a favourable mechanical stability and a high scratch resistance remains unsolved.

It was therefore an object of the present invention to provide a structured surface comprising a plurality of micro-scale and/or nano-scale surface elements that exhibits favourable mechanical properties and, in particular, a high scratch resistance. It is another object of the present invention to provide a hydrophobic structured surface comprising a plurality of micro-scale and/or nano-scale surface elements that maintains its hydrophobic character when subjected to mechanical stress. It is, in particular, an object of the present invention to provide a scratch-resistant structured surface including a plurality of both micro- and nano-scale surface elements having a high static contact angle against water of at least 130°.

SHORT DESCRIPTION OF THE INVENTION

The objects of the present invention are solved by the following embodiments.

A first embodiment of the present invention provides a scratch-resistant micro- and/or nanostructured surface comprising a plurality of micro-scale and/or nano-scale surface elements, said surface being essentially unchanged when being subjected to 10 rubbing cycles according to A.A.T.C.C. test method 8-1972 using a cotton cloth and a total stamp weight of 300 g, and comprising a polymeric material having 1) an elongation at break of at least 10%, 2) an irreversible relative plastic deformation (permanent set) of less than 2% and a 3) a tensile strength of at least 5 MPa.

Another embodiment of the present invention provides a hydrophobic surface comprising a plurality of micro-scale and/or nano-scale surface elements and having a static contact angle against water of at least 90°, such surface comprising a polymeric material having 1) an elongation at break of at least 10%, 2) an irreversible plastic deformation (permanent set) of less than 2%, and 3) a tensile strength of at least 5 MPa.

In a preferred embodiment such hydrophobic structured surfaces remain essentially unchanged when being subjected to 10 rubbing cycles according to A.A.T.C.C. test method 8-1972 using a cotton cloth and a total stamp weight of 300 g.

In another preferred embodiment the hydrophobic surfaces of the present invention comprise a plurality of micro-scale and, optionally, nano-scale surface elements and have a contact angle against water of at least 130°.

In a preferred embodiment the polymeric material comprised in the structured surfaces of the invention is obtainable by radiation curing of a UV-curable precursor comprising a) at least 60 weight % of one or more cross-linkable oligomer and/or polymer compounds, b) 2-40 weight % of one or more reactive diluents, c) 0.05-10 weight % of one or more hydrophobic additives, and d) 0-5 weight % of one or more photoinitiators.

The present invention further provides a method of preparing scratch-resistant micro- and/or nano-structures comprising a plurality of micro-scale and/or nano-scale surface elements, said method comprising the steps of (i) providing a tool surface comprising a plurality of micro- and/or nano-structured surface elements forming the negative of the structured surface, and (ii) replicating the structured surface from the tool surface by applying a UV- or electron beam curable precursor of a polymeric material onto the tool surface, radiation curing the precursor, and removing the replicated structured surface from the tool surface, wherein the precursor is selected to provide upon curing a polymer material having 1) an elongation at break of at least 10%, 2) an irreversible plastic deformation (permanent set) of less than 2%, and 3) a tensile strength of at least 5 MPa, and wherein the surface is essentially unchanged when subjected to 10 rubbing cycles according to A.A.T.C.C. test method 8-1972 using a cotton cloth and a total stamp weight of 300 g.

The present invention further provides a method of preparing hydrophobic micro- and/or nano-structured surfaces comprising a plurality of micro-scale and/or nano-scale surface elements, said method comprising the steps of (i) providing a tool surface comprising a plurality of micro- and/or nano-structured surface elements forming the negative of the structured surface, and (ii) replicating the structured surface from the tool surface by applying a UV- or electron beam curable precursor of a polymeric material onto the tool surface, radiation curing the precursor, and removing the replicated structured surface from the tool surface, wherein the precursor is selected to provide upon curing a polymer material having 1) an elongation at break of at least 10%, 2) an irreversible plastic deformation (permanent set) of less than 2%, and 3) a tensile strength of at least 5 MPa, and wherein the surface has a static contact angle against water of at least 90°.

In a preferred embodiment of the methods according to the present invention the UV- or electron beam curable precursor is continuously supplied to the tool surface, and the replicated structured surface is continuously removed from the tool surface.

The invention furthermore relates to a composite article comprising a substrate selected from a group of substrates comprising glass, polymers, metals, wood, concrete, and stone wherein a structured, scratch-resistant and hydrophobic surface of the invention is attached to such substrate.

SHORT DESCRIPTION OF FIGURES

Figure 1B:
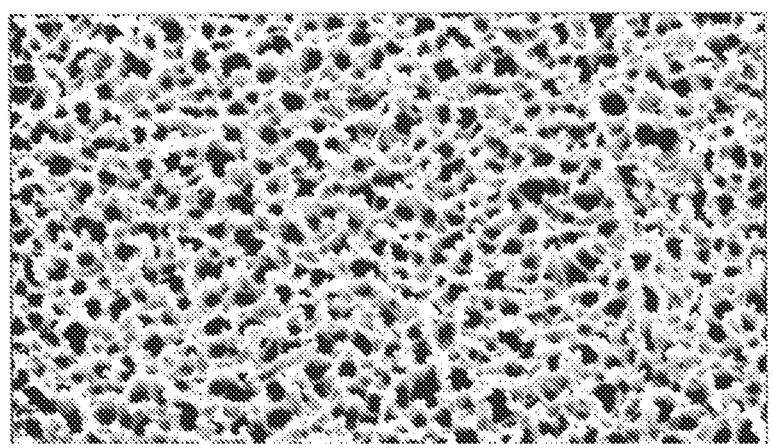

FIG. 1a and FIG. 1b are micro-photographs of an embodiment of a structured surface of the present invention comprising protruding rail-type surface elements arranged regularly which are tapering from bottom to top and extending essentially in parallel in a longitudinal direction. The cross-sectional dimensions of the rails are of a µm-scale whereas the longitudinal extension of the rails is macroscopic (FIG. 1a). The protruding surface elements are separated at their bottom by valleys exhibiting surface elements of a nm-scale which are arranged randomly. The surface structure of the nano-scale surface element present in the valleys is shown in FIG. 1b. The structure is also termed as a SonS surface (structure on structure).

The micro- and nano-structured surface of FIGS. 1a and 1b can be obtained by replication from a micro- and nano-scale tool surface referred to above and below as "tool surface 2".

Figure 2A:
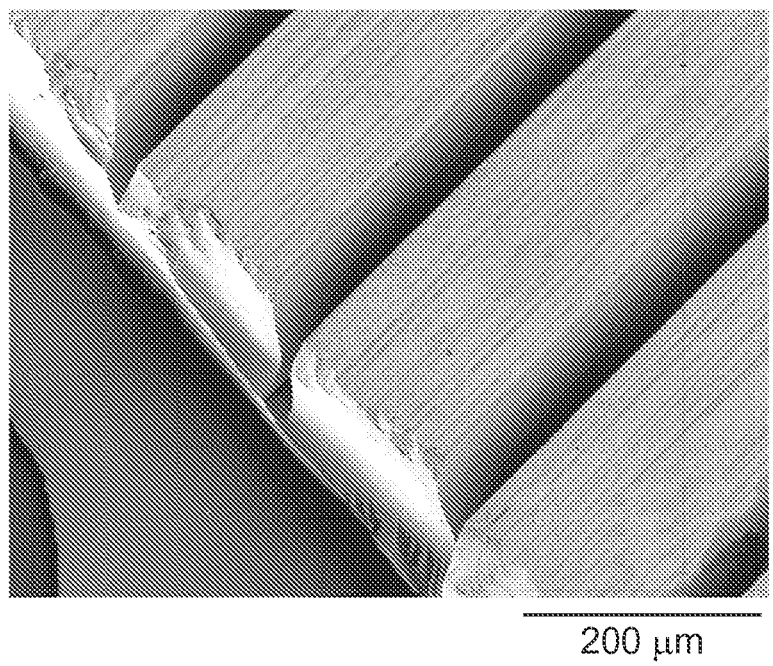
Figure 2B:
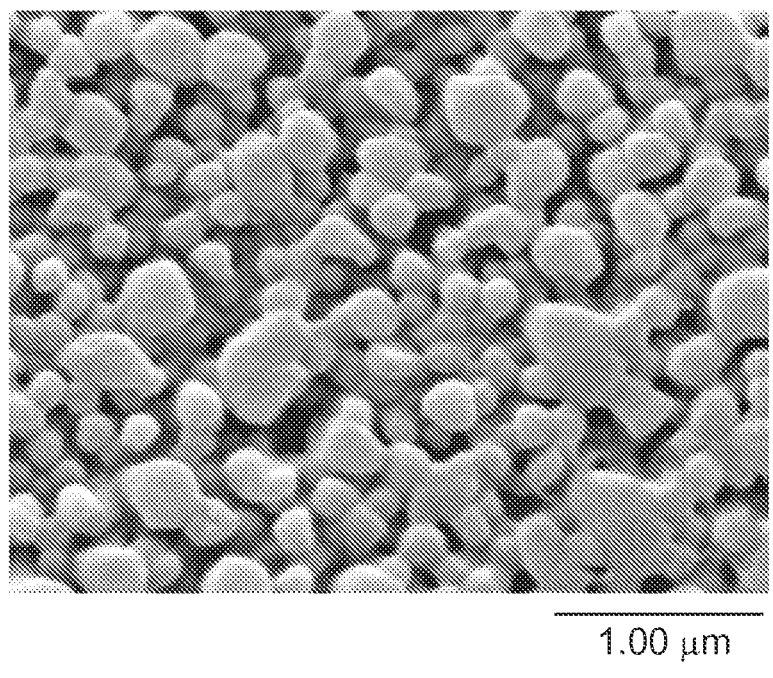

FIG. 2a and FIG. 2b are micro-photographs of another embodiment of a structured surface of the present invention which comprises regularly arranged linear channel-type surface elements which are extending essentially in parallel in a longitudinal direction. The cross-sectional dimensions of the channels are of a µm-scale whereas the longitudinal extension of the rails is macroscopic (FIG. 2a). The surface elements separated by the channels have a rail-type shape which longitudinally extends in parallel with the channels. The rail-type surface elements bordered by the channels exhibit a µm-scale. The exposed surfaces of the rail-type surface elements is essentially flat and bears surface elements of a nm-scale which are arranged randomly (shown in FIG. 2b).

The micro- and nano-structured surface of FIGS. 2a and 2b can be obtained by replication from a micro- and nano-scale tool surface referred to above and below as "tool surface 1".

FIGS. 3a and 3b depicts the surface structure of an optical film product available from 3M Comp. as Brightness Enhancement Film BEF II 90/24. This film which is used in this invention as tool surface 3 comprises micro-scale prismatic rail-type surface elements extending in a longitudinal direction (see FIG. 3a). The rail-type surface elements have a triangular cross-section normal to the extension of the rails. This can be seen from the schematic cross-sectional view of FIG. 3b normal to the longitudinal macroscopic extension of the rail-type surface elements.

FIGS. 4a and 4b are schematic views of a stamp tool suitable for performing the rubbing procedures according to A.A.T.C.C. test method 8-1972 using a cotton cloth and a total weight of 300 g (also referred to below and above as rubbing procedure "RP-300") or using a cotton cloth and a total weight of 920 g (also referred to below and above as rubbing procedure "RP-920"), respectively. The test methods RP-300 and RP-920, respectively, are described in the test section below. FIGS. 4a and 4b, respectively, provide a schematic side-view and a schematic bottom view of the tool.

FIGS. 5a to 5c each depict an SEM photo (upper photo) and a photo taken by an optical camera (lower photo) of the structured surfaces of Example 6D, Comparative Example 6 and Comparative Example 7, respectively, after having subjected them to the surface treatment of the rubbing procedure RP-300 (10 rubbing cycles).

Figure 6A:
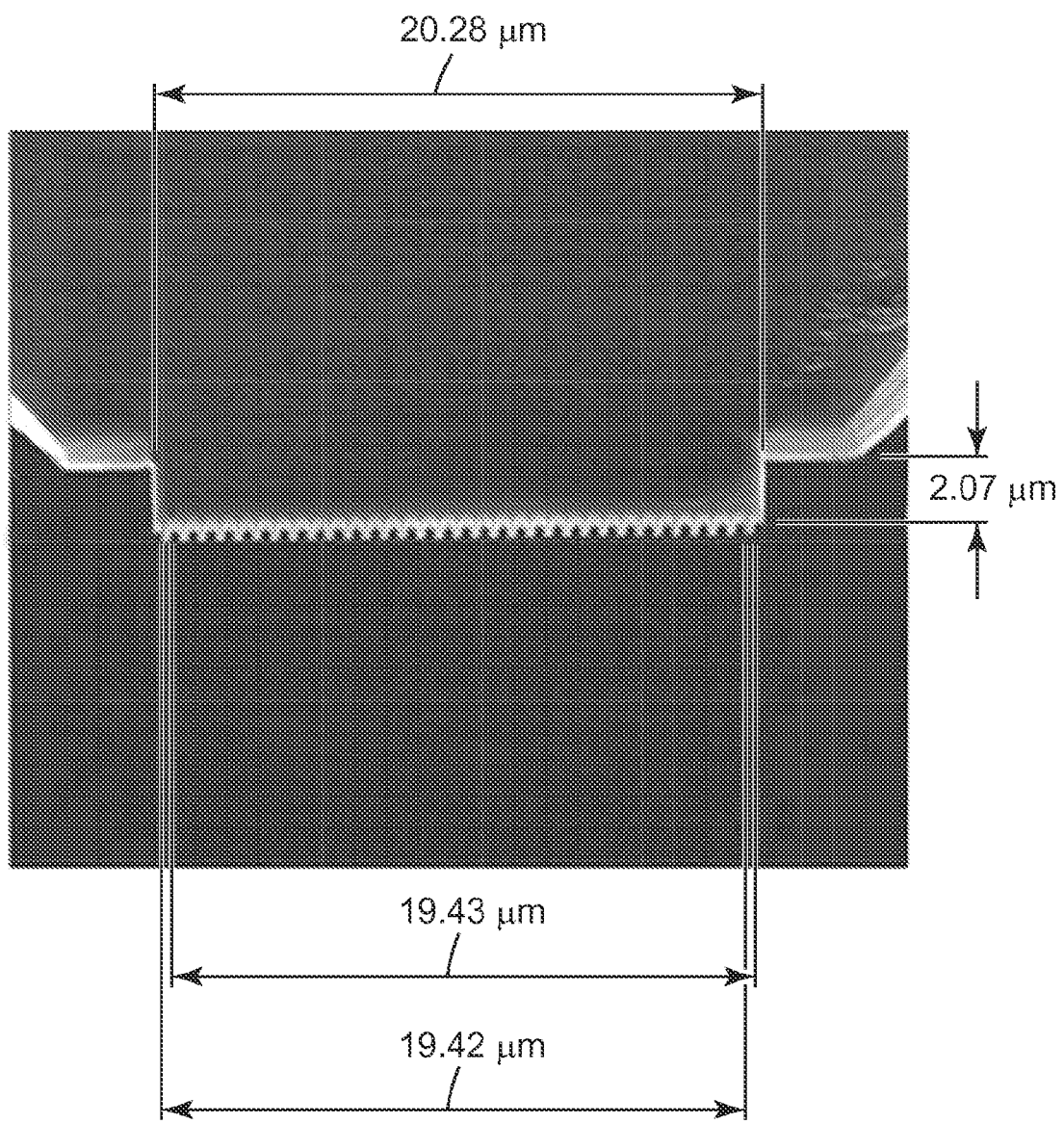
Figure 6B:
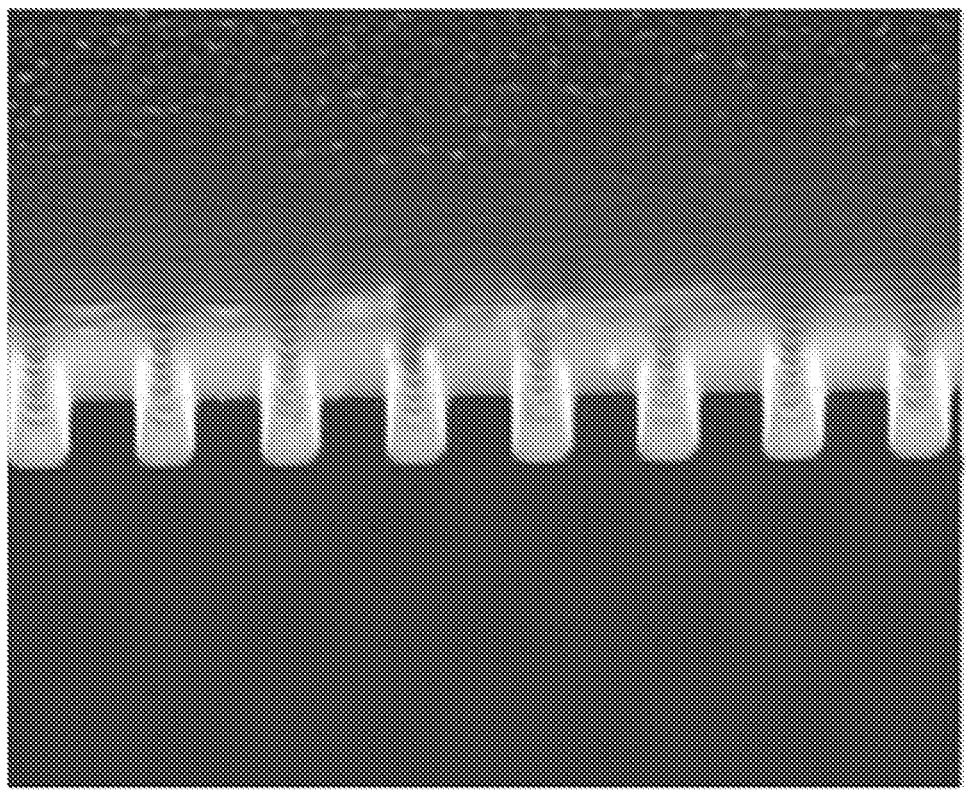

FIGS. 6a to 6b show microphotographs of the tool surface 4B at different magnifications.

DETAILED DESCRIPTION OF THE INVENTION

A first preferred embodiment of the present invention relates to a scratch-resistant structured surface comprising a plurality of micro-scale and/or nano-scale surface elements wherein the surface comprises a polymeric material which is selected so that the surface remains essentially unchanged when subjected to 10 rubbing cycles according to A.A.T.C.C. test method 8-1972 using a cotton cloth and a total stamp weight of 300 g.

Another preferred embodiment of the present invention relates to hydrophobic structured surfaces comprising a plurality of micro-scale and/or nano-scale surface elements and having a static contact angle against water of at least 90° wherein the surface comprises an essentially elastomeric polymeric material having favourable mechanical properties.

The term micro-scale and nano-scale surface elements, respectively, as used above and below refers to discrete surface elements arranged at a surface wherein at least one of the length, width, size or height (or depth), respectively, of the surface element is of a μm-scale or of a nm-scale, respectively.

The surface that comprises a plurality of said micro-scale and/or nano-scale surface elements is referred to above and below as micro-structured surface comprising surfaces having micro-scale surface elements or both micro-scale and nano-scale surface elements, or as nano-structured surfaces comprising nano-scale surface elements but no micro-scale surface elements. The micro- or nano-structured surfaces usually have a macroscopic length and width, respectively. The term macroscopic or macro-scale, respectively, is used above and below to characterize the extension of structured surfaces or surface elements, respectively, which is more than 1 mm.

The size of a specific micro-scale or nano-scale surface element, respectively, is defined as its maximum extension in any direction parallel to the surface, i.e., for example, as the diameter of a cylindrical surface element or the diagonal of the base surface of a pyramidal surface element. In case of surface elements having a macro-scale extension in one or more directions within the surface (or parallel to the surface) and a micro- or nano-scale extension in one or more other directions within the surface, the term size of the surface elements refers to the micro- and/or nano-scale extension of such surface elements.

The length of a specific micro-scale or nano-scale surface element, respectively, is defined as its extension in the direction of the length of the structured surface. Likewise, the width of a specific micro-scale or nano-scale surface element, respectively, is defined as its extension in the direction of the width of the structured surface.

The height of a protruding (or elevating) surface element is defined by its respective extension as measured from the adjacent bottom surface on which the respective protruding surface element is arranged in the direction perpendicular to such bottom surface. Likewise, the depth of a surface element extending downwardly from an adjacent top exposed surface is defined by its respective downward extension as measured from the adjacent top surface from which the indentation extends, in the direction perpendicular to such top surface.

The distance between two adjacent surface elements is defined as the distance between two maxima or two relative maxima, respectively, between such surface elements in a direction within the structured surface.

Structured surfaces having a regular sequence of surface elements in one or more given direction parallel to the surface can be characterized by one or more pitch lengths in such directions. In a certain direction parallel to the surface the term pitch length denotes the distance between corresponding points of two adjacent, regularly repetitive surface elements. This may be illustrated for a structured surfaces comprising an alternating sequence of channel- and rail-type surface elements surface elements which both macroscopically extend, essentially parallel to each other, in a first longitudinal direction and which each have a micro- and, optionally, nano-scale cross-section normal to said longitudinal direction (see FIGS. 1a and 2a). The pitch length of such structured surface normal to the longitudinal direction is the sum of the width of the channel-type surface element and the width of the rail-type surface element in such normal direction.

The structured surfaces of the present invention comprise a plurality of micro- and/or nano-scale surface elements. Structured surfaces comprising both micro- and nano-scale surface elements are preferred.

Especially preferred are structured surfaces exhibiting at least two different surface elements of a distinctly different scale. The surface structure can be random so that it comprises, for example, a random distribution of nano- and micro-scale surface elements which may exhibit a broad variety of sizes and shapes. The vapour-deposited structured surfaces and the corresponding negative or positive, respectively, replica surfaces of U.S. Pat. No. 6,641,767 disclose such a random surface having both macro- and nano-scale surface elements.

Especially preferred are furthermore structured surfaces comprising a plurality of protruding larger scale surface elements having an exposed top surface and bearing a plurality of the smaller scale surface elements on the exposed top surface of the protrusions and/or on the surface of the indentations between the protrusions, respectively. These structures are also referred to above and below as SonS-type structure (structure-on-structure).

The larger scale surface element which preferably have a micro-scale extension may be arranged essentially regularly and/or exhibit an essentially regular shape. Such a microscopically regular SonS structure is shown, for example, in FIGS. 2a and 2b below where the rail-type surface elements (FIG. 2a) are of a micro-scale which bear a multitude of randomly arranged nano-scale surface elements depicted in FIG. 2b. Another useful example of a SonS structure is disclosed, for example, in FIG. 1 of EP 0,933,388. It was found that SonS structured surfaces tend to exhibit higher contact angles against water in comparison to surfaces having only the large-scale or the low-scale surface elements, respectively.

At least one of the length, width, size or height (depth) of the micro-scale structured surface elements useful in the present invention is between 1-1,000 μm, more preferably between 2-500 μm and especially preferably between 2-250 μm.

At least one of the length, width, size or height (depth) of the nano-scale structured surface elements useful in the present invention is between 10 nm and 1,000 nm, more preferably between 20 nm and 500 nm and especially preferably between 50 nm and 400 nm.

The height and the depth of the surface elements, respectively, useful in the present invention preferably varies between 10 nm to 500 μm, more preferably between 25 nm and 300 μm and especially preferably between 50 nm and 250 μm.

The distance between two adjacent surface elements present in the structured surface of the present invention preferably varies between 10 nm to 500 μm, more preferably between 50 nm and 500 μm and especially preferably between 100 nm and 350 μm. Preferably, the distance between two adjacent micro-scale surface elements is at least 50 nm and, in particular, between 100 nm and 500 μm. The distance between two adjacent nano-scale surface elements preferably is at least 1 nm, more preferably at least 2 nm and, in particular, between 5 nm and 250 nm.

At least one of the average size, depth and/or height of the micro-scale surface elements useful in the present invention preferably is between 2-200 μm and more preferably between 2-150 μm. The average dimensions of the micro-scale surface elements can be determined, for example, by taking and evaluating SEM microphotographs.

At least one of the average size, depth and/or height of the nano-scale surface elements useful in the present invention preferably is between 10-500 nm and more preferably between 10-250 nm. The average dimensions of the nano-scale surface elements can be determined, for example, by taking and evaluating SEM microphotographs The average distance between two adjacent surface elements or structures, respectively, preferably is at least about 10 nm, more preferably at least about 25 nm and especially preferably at least about 30 nm. The average dimension of the distance between two adjacent surface elements can be determined, for example, by taking and evaluating SEM microphotographs.

It is differentiated in the present invention between micro- or nano-structured tool surfaces and micro- or nano-structured surfaces which can be obtained from said tool surfaces by replication. If desired, a micro- or nano-structured surface which was replicated from a tool surface in the first place, can be used as a tool surface in subsequent manufacturing.

The micro- and/or nano-scale surface elements can be arranged on the structured surface in a regular or random pattern. Also, the shape and cross-section of the micro- and, if present, nano-scale surface elements of the tool surfaces or structured surfaces, respectively, may vary broadly. The surface elements may exhibit geometrically regular shapes and cross-sections, or the shapes and cross-sections may be irregular and random. Examples of geometrically regular cross-sections include triangular, rectangular, polygonic, semi-circular or semi-elliptical cross-sections, for example. Examples of geometrically regular shapes comprise prismatic or cylindrical structures, linear grooves or channels and the like. Structured surfaces comprising regular surface elements in a regular pattern, are referred to as regular structured surfaces whereas other structured surfaces are referred to as random.

Irregular micro- and, optionally, nano-structured surfaces can be obtained, e.g., by the chemical vapour deposition process disclosed in U.S. Pat. No. 6,641,767. The tool surface obtained by this method includes a plurality of randomly positioned surface elements of multiple shapes and sizes. This surface is then replicated into a structured surface being the negative of the vapour-deposited surface. If desired such replicated structured surface can be used as a tool surface which can be further replicated to a positive replica of the vapour-deposited tool surface. FIGS. 6 and 7 of U.S. Pat. No. 6,641,767, respectively, which display a negative (FIG. 6) and positive (FIG. 7) replica, respectively, of a vapour-deposited tool surface both display surface elements having widely varying geometric shapes including essentially conical, tubular, annular or angular shapes. The surface elements are furthermore arranged randomly.

Regular micro- and, optionally, nano-scale tool surfaces can be obtained by cutting a metal surface such as a copper or nickel plated steel surface, for example, with a diamond cutting tool. Diamond cutting tool techniques are disclosed, for example, in U.S. Pat. No. 7,140,812. Regular micro- and, optionally, nano-scale tool surfaces can also be obtained, for example, by etching procedures which are known from photographic processes or processing techniques for semiconductor materials.

The micro- and, optionally, nano-structured surfaces of the present invention are preferably replicated from regular tool surfaces. Hence, the micro- and, optionally, nano-structured surfaces of the present invention are preferably regular.

In a preferred embodiment the micro- or nano structured surfaces of the present invention comprise surface elements such as channels or rails, respectively, which macroscopically extend in a first longitudinal direction. Examples of such surfaces are shown in FIGS. 1-3 below. The cross-section of such surface elements normal to the longitudinal direction exhibits in at least one of the two directions orthogonal to the longitudinal direction micro- and/or nano-scale surface elements. The surface elements may extend in the longitudinal direction, for example, essentially straight or in a wavy or zig-zag form. The cross-section of the surface elements normal to the longitudinal direction may be, for example, triangular, rectangular, trapezoid, semi-circular or of any other regular polygonic or curved form.

In another preferred embodiment, the structured surface of the present invention comprises micro-scale and/or nano-scale surface elements regularly arranged both in a longitudinal direction and in direction arranged normally or in a skewed angle relative to the longitudinal direction, respectively.

Regular surfaces are preferably characterized in a given direction by the so-called pitch length as defined above.

Structured surfaces according to the present invention may comprise unstructured and structured surface areas which can be arranged in an irregular or regular pattern such as, for example, a checkerboard pattern.

Above and below, essentially smooth surfaces which do not exhibit a plurality of micro-scale surface elements are referred to as unstructured or smooth surfaces. Float glass usually exhibits a smooth, unstructured surface. Smooth surfaces may also be provided, for example, by polymer films which were obtained by extrusion of the polymer between smooth, polished steel rolls or calendaring of an extruded polymer film between polished steel rolls, respectively.

The morphology of surfaces can generally be characterized by surface roughness parameters such as, for example, the roughness average Ra which is defined as the arithmetic average of the absolute values of the roughness profile ordinates; the single roughness depth Rzi which is defined as the vertical distance between the highest peak and the deepest value within a sampling length; the mean roughness depth Rz which is defined as the mean value of the single roughness depths Rzi of consecutive sampling lengths; and the maximum roughness depth Rmax which is defined as the largest single roughness depth within the evaluation length. These definitions have been taken from DIN ISO 4287 and 4288, respectively. A test method for determining surface roughness parameters is described in the test section below. It should be noted, however, that this test method may be suitable, in particular, for micro-structured surfaces whereas nano-structured surfaces may require test methods for determining surface roughness parameters which have a higher resolution such as spectroscopic methods or the atomic force microscopy (AFM) method.

Essentially smooth, unstructured surfaces which are used as a reference point in the present invention preferably exhibit a low Ra value of typically not more than about 0.1 μm. According to H. Buscher et al., *The Effect of Surface Roughness of Polymers on Measured Contact Angles of Liquids, Colloids and Surfaces*, 9, pp. 319-331 (1984), smooth surfaces can be obtained by forming a replicate of a smooth PET film having a roughness Ra of about or smaller than 0.1 μm or a smooth glass surface having a similar surface roughness. It should be noted, though, that a low Ra value is necessary but not sufficient for defining an essentially smooth, unstructured surface. It is furthermore required that the surface morphology is random, i.e. does not exhibit a regular pattern.

In the Example section below, unstructured surfaces have been prepared by applying a radiation-curable precursor material to a smooth glass surface or to the surface of specific commercially available liners, radiation-curing the precursor material and removing the resulting cured film from the glass or liner substrate. The surface of the film which had been in contact with the smooth glass surface or the liner surface, respectively, was found to be unstructured and was used to evaluate the contact angle of the material forming the unstructured surface against water. Commercially available liners which were used for preparing essentially homogenous surfaces include, for example, MELINEX 505 film from DuPont Teijin Films Luxemboug S.A. or HOSTAPHAN 2SLK from Mitsubishi Polyester Film GmbH, Wiesbaden, Germany.

Surfaces which exhibit a static contact angle against water of between at least 70° and less than 130° are referred to above and below as hydrophobic surfaces. Surfaces having a static contact angle against water of at least 130° or more are referred to above and below as super-hydrophobic surfaces. The hydrophobic structured surfaces of the present invention have a static contact angle against water of at least 90°.

The hydrophobicity of surfaces can be quantitatively measured with a goniometer device which applies a water droplet having a defined volume at a temperature of 23° C. to the surface to be characterized. The goniometer device takes a photograph which is automatically evaluated in terms of the surface contact angle between the surface and the water droplet. Details of the method of measurement are given in the Test Method section below. The contact angle of structured surfaces comprising surface elements such as channels or rails, respectively, which macroscopically extend, essentially parallel to each other, in a first longitudinal direction and which have a micro- and, optionally, nano-scale cross-section normal to said longitudinal direction, against water is preferably evaluated as follows. The contact angle of water is measured both in a first viewing direction corresponding to the longitudinal direction and in a second viewing direction normal to said longitudinal direction. The contact angle against water reported for such surfaces is then obtained as the arithmetic average value of the arithmetic averages of said measured longitudinal and normal contact angles against water, respectively.

The contact angle of a structured surface, e.g., against water mainly depends on the properties of the material forming the structured surface such as, e.g., the surface energy of the material, and the structure of the surface. The contact angle between a water droplet and a structured surface and thus the water repellence of the structured surface can be increased by decreasing the contact area between the water droplet and the structured surface thereby increasing the water/air interface and decreasing the interface between the solid structured and water. While the present inventors do not wish to be bound by such theory it is speculated that on such a structured surface with a low contact area between the water droplet and the structured surface the water gains very little energy through adsorption to compensate for an enlargement of its surface so that spreading does not occur.

It was furthermore found by the present inventors that the surface elements of a structured hydrophobic surface preferably have a height of between 5-100 μm and a distance of between the surface elements of between 5-200 μm and more preferably of between 10-100 μm in order to provide a high static contact angle between a water droplet and such structured surface. If the surface elements of the structured surface are too close together the structured surface may be seen by the water droplet essentially as a "closed surface" which can be more readily wetted. When decreasing the distance between, for example, protruding surface elements or elevations the height of such elevations preferably is also increased. According to U.S. Pat. No. 3,354,022 the critical air content of a solid surface (i.e. the ratio of the surface area not in contact with the water droplet over the surface area which is in contact with the water droplet) is about 60%. Above that value the surface is hydrophob and the hydrophobicity increases with increasing air content.

B. Viel discloses on pp. 72-74 of his PhD thesis with the title "Strukturierte Kolloidpartikel für ultrahydrophobe, schmutzabweisende Oberflächen" (structure colloid particles for ultra-hydrophobic, dirt repellent surfaces), submitted with the Technical University of Darmstadt on Sep. 5, 2007 and published in Darmstadt, Germany, 2008 that one can differentiate between two theoretical extreme cases which are referred to as homogenous and heterogeneous wet-out, respectively, of a droplet at a rough surface. In case of a homogenous wet-out which has been described by R. N. Wenzel, *Ind. Eng. Chem.*, 28, 988 (1936), the droplets are essentially fully wetting the rough surface and penetrate, for example, into small recesses formed by protruding portions of the surface elements of the rough surface. In case of a heterogeneous wet-out which has been described by A. B. D Cassie, S. Baxter, *Trans. Faraday Soc.*, 40, 546 (1944), the droplets are not fully wetting the rough surface but the droplets may rest, for examples, on protruding portions of small surface elements of the rough surface. Thus, an air gap is formed between portions of the surface of the droplet facing the surface and the surface resulting in droplets "hovering" over the surface.

In the case of a homogenous wet-out according to Wenzel the static contact angle of a surface relative to a water droplet is usually increasing with increasing surface roughness. In case of a heterogeneous wet-out according to Cassie the static contact angle of a rough surface relative to a water droplet is usually increasing if the portion of the structured surface which is not wetted out increases.

Viel discloses on p. 73 of his PhD thesis (loc. cit) that super-hydrophobic surfaces tend to exhibit heterogeneous surface wetting whereas hydrophobic surfaces tend to exhibit homogeneous surface wetting.

The structured surfaces of a preferred embodiment of the present invention are hydrophobic which term includes both hydrophobic and super-hydrophobic structured surfaces. Hydrophobic surfaces of the present invention, i.e. structured surfaces having a static contact angle against water of between 90° and 130°, comprise nano-structured surfaces, microstructured surfaces and micro- and nanostructured surfaces, respectively. Super-hydrophobic surfaces of the present invention, i.e. structured surfaces exhibiting a static contact angle against water of at least 130°, preferably comprise micro-structured surfaces and micro- and nano-structured surfaces whereby the dimensions of the surface elements preferably have a height of between 5-100 μm and a distance of between the surface elements of between 5-200 μm.

The micro- and, optionally, nano-structured surfaces of the present invention comprises a polymeric material having 1) an elongation at break of at least 10%, 2) an irreversible relative plastic deformation (permanent set) of less than 2%, and 3) a tensile strength of at least 5 MPa.

It has been found by the present inventors that such materials allow for providing micro- and/or nano-structured surfaces which are mechanically durable and "forgiving" to mechanical stress.

The micro- and/or nano-structured surfaces of the present invention comprise a polymeric material which is essentially elastomeric. Elastomeric means that the material will substantially resume its original shape after being stretched or mechanically distorted otherwise. Although the present inventors do not wish to be bound to such explanation it is speculated that the surface elements and structures of the surfaces of the present invention comprising such elastomeric material tend to essentially elastically deform when being subjected to mechanical stress thereby minimizing mechanical damaging of the surface structure.

The elastomeric properties of the material used in the surfaces of the present invention are quantitatively defined by a low permanent set of less than 2%, more preferably of not more than 1.5% and especially preferably of not more than 1.0%. The permanent set of a material which quantifies its irreversible relative plastic deformation can be measured according to the standard test method ASTM D 412-98a (2002) referred to in the Test Section below.

The polymeric material comprised in the micro- and/or nano-structured surfaces of the present invention furthermore exhibits a tensile strength of at least 5 MPa and an elongation at break of at least 10% as measured according to DIN EN ISO 527-1 and 527-2 as described in more detail in the test section below. The tensile strength of the polymeric material is more preferably at least 10 MPa and especially preferably at least 20 MPa. Particularly preferred are polymeric materials having a tensile strength of at least 20 MPa and an elongation at break of at least 15%.

It was found by the present inventors that structured surfaces of the present invention comprising a polymeric material having both an elongation at break of at least 10%, a tensile strength of at least 5 MPa and an irreversible relative plastic deformation (permanent set) of less than 2% exhibit, in particular, a favourable scratch resistance. Such property is essential for applications where the micro-structured surfaces of the present invention are applied to substrates or articles to provide super-hydrophobicity and/or an easy-to-clean effect to such substrates and articles.

A test method for assessing the scratch resistance of a surface is the so-called Ericson test which is specified in the test section below. This test involves treating the surface with graphite pencils of different hardnesses (measured in H values). A more scratch-resistant material will yield a higher H value, hence a material having a higher H value is preferred.

Another test for assessing the scratch resistance of a surface is specified in the A.A.T.C.C. rubbing method 8-1972 using a total rubbing weight of 300 g or 920 g, respectively, and a cotton cloth or stainless steel wool, respectively.

In a preferred embodiment the surface of the present invention is essentially unchanged when subjected to 10 rubbing cycles according to A.A.T.C.C. test method 8-1972 using a cotton cloth and a total stamp weight of 300 g. This can be assessed, for example, by using optical methods or by taking SEM photographs to characterize the surfaces prior to and subsequent to said rubbing procedure, respectively.

An example of an optical test method comprises recording interference spectra of the surfaces prior to and subsequent to said rubbing treatment and qualitatively comparing such spectra. This method which is described in the test section below for the case of interference spectra obtained with visible light, compares such interference spectra obtained from a surface prior to and subsequent to said rubbing procedure, respectively. FIG. 5a shows the spectrum of the structured surface of the invention according to Example 6D after said rubbing treatment. The spectrum essentially corresponded to the spectrum recorded prior to said surface treatment, i.e. the spectrum of the surface of Example 6D remained essentially unaffected by said rubbing treatment. Contrary to that FIGS. 5b and 5c show interference spectra obtained for the surfaces of Comparative Examples 6 and 7, respectively, after said rubbing procedure. Prior to said rubbing procedure the interference spectra recorded for the surfaces of Comparative Examples 6 and 7, respectively, corresponded to that of FIG. 5a. It can be seen that the interference spectra of Comparative Examples 6 and 7, respectively, were distinctly changed by said rubbing procedure and did not remain essentially unchanged.

FIGS. 5a-5c also illustrate another method used for qualitatively assessing whether a structured surface is affected by the above rubbing procedure. This method compares SEM photographs taken from a surface prior to and subsequent to said rubbing procedure, respectively. FIG. 5a shows a SEM photo of the structured surface of the invention according to Example 6D after said rubbing treatment. The SEM photo essentially corresponded to the SEM photo taken prior to said rubbing treatment, i.e. the SEM photo of the surface of Example 6D did essentially not change after having subjected the surface to said rubbing treatment. Contrary to that FIGS. 5 b and 5c show SEM photos obtained for the surfaces of Comparative Examples 6 and 7, respectively, after said rubbing procedure. Prior to said rubbing procedure the SEM photos taken for the surfaces of Comparative Examples 6 and 7, respectively, corresponded to that of FIG. 5a. It can be seen that the SEM photos taken from the surfaces of Comparative Examples 6 and 7, respectively, after said rubbing treatment distinctly differed from the SEM photos taken from these surfaces prior to the rubbing treatment. The surfaces of Comparative Examples 6 and 7, respectively, thus changed as a result of said rubbing procedure and did not remain essentially unchanged.

It was found by the present inventors that the polymeric material comprised in the micro- and/or nano-structured surfaces of the present invention is preferably obtained by curing a UV-curable precursor comprising a) at least 60 weight % of one or more cross-linkable oligomer and/or polymer compounds, b) 2-40 weight % of one or more reactive diluents, c) 0.05-10 weight % of one or more hydrophobic additives, and d) 0-5 weight % of one or more photo-initiators.

The term oligomer compounds as used above and below refers to relatively low molecular weight compound consisting of few, typically less than 10 monomer units. The monomer units may be structurally identical or similar, or they can be different from each other. Oligomeric compounds are typically liquid at room temperature and ambient pressure whereby the dynamic viscosity is preferably less than 500 Pas and more preferably less than 200 Pas at 23° C. measured according to DIN EN ISO 2555 (Brookfield method).

The term reactive diluent as used above and below refers to low weight monomers which are able to participate in a polymerisation reaction to form a polymeric material. The weight average molecular weight Mw of such monomer compounds preferably is less than 1,000 and more preferably less than 750.

The UV-curable precursor suitable for use in the micro-structured surfaces of the present invention comprises at least 60 weight % and more preferably at least 80 weight % of one or more crosslinkable oligomer and/or polymer compounds which are preferably selected from a group of materials comprising but not restricted to acrylated oligomer or polymer compounds such as urethane acrylates, vinyl acrylates, epoxy acrylates, polyester acrylates, polyacrylates, polyether acrylates, olefin acrylates, acrylated oils and silicon acrylates.

Urethane acrylates which are useful in the present invention preferably are urethane acrylate oligomers. Urethane acrylate oligomers oligomers suitable in the present invention can generally be prepared from alcohols containing (meth) acryloyl groups and di- or polyisocyanates. Preferred urethane acrylate oligomers are disclosed, for example, in U.S. Pat. No. 6,465,539. An especially preferred class of urethane acrylate oligomers includes di- or higher functional acrylate esters of hydroxyl-terminated NCO extended polyesters or polyethers which can be aliphatic or aromatic. Examples of useful urethane acrylate oligomers include those commercially available from Henkel Corp. under the trade name PHOTOMER (e.g., PHOTOMER 6010) and from UCB Radcure Inc. under the trade names EBECRYL (e.g., EBECRYL 220, 284, 4827, 4830, 6602, 8400 and 8402), RXO (e.g., RXO 1336), and RSX (e.g., RSX 3604, 89359, 92576). Other useful urethane acrylate oligomers are commercially available from Sartomer Co. under the trade name SARTOMER (e.g., SARTOMER 9635, 9645, 9655, 963-B80, and 966-A80), and from Morton International under the trade name UVITHANE (e.g., UVITHANE 782). Another useful urethane acrylate oligomer is commercially available as GENOMER 4316 from Rahn A G, Zurich, Switzerland. Urethane acrylate oligomers tend to improve the robustness and, in particular, the tensile strength of the polymeric material obtained by curing the UV-curable precursor. The precursor preferably comprises between 60 and 98 weight % and more preferably between 70 and 95 weight % of one or more urethane acrylate oligomers or polymers, respectively.

Acrylates epoxy materials which are useful in the present invention preferably are acrylate epoxy oligomers. Acrylated epoxy oligomers include, for example, di- or higher functional acrylate esters of epoxy resins such as the diacrylate esters of bisphenol A epoxy resin. Examples of useful acrylated epoxies include those commercially available from UCB Radcure Inc. under the EBECRYL and RXO trade names (e.g., EBECRYL 600,629,860, 1608 and 3708, RXO 2034) and from Henkel Corp. under the PHOTOMER trade name (e.g., PHOTOMER 3016, 3038 and 3071). Another useful epoxy diacrylate oligomer is commercially available as CN-UVE 151 M from Cray Valley, Paris, France.

Acrylated epoxy resins tend to improve the tensile strength and elongation at break of the polymeric material obtained by curing the UV-curable precursor.

Polyacrylates are acrylic oligomers or polymers that have reactive pendant or terminal acrylic acid groups capable of forming free radicals for subsequent reaction. Polyacrylate materials which are useful in the present invention preferably are polyacrylate polymers. Like the acrylated epoxy materials, the polyacrylates generally improve the tensile strength of the material obtainable by curing the UV-curable precursor.

Examples of polyacrylate polymers that are useful in the present invention are those commercially available from UCB Radcure under the EBECRYL trade name (e.g., EBECRYL 745, 754, 767, 1701, and 1755), from Sartomer Co. under the trade designation NTX4887 (a fluoro-modified acrylic oligomer), and from B.F. Goodrich under the trade name HYCAR (e.g., HYCAR 130X43).

Similarly, acrylated olefin oligomers or polymers are unsaturated oligomeric or polymeric materials having reactive pendant or terminal acrylic acid groups capable of forming free radicals for cross-linking or chain extension. The acrylated olefins generally tend to improve the tensile strength and the elongation at break of the material obtained by curing the UV-curable precursor. Examples of useful acrylated olefins include polybutadiene acrylic oligomers which are commercially available from Sartomer Co. under the trade name SARTOMER CN302, and from Ricon Resins under the trade name FX9005.

Polyester acrylate oligomers or polymers suitable in the present invention can be generally prepared by condensation reactions between acrylic acid and polyols or polyesters, respectively. Examples of useful acrylated polyester compounds include those commercially available from UCB Radcure Inc. under the EBECRYL trade name (e.g. EBECRYL 810, EBECRYL 813 and EBECRYL 830) and from Henkel Corp. under the PHOTOMER trade name (e.g., PHOTOMER ECX 5010 F, 5429 F and 5432).

Polyether acrylate oligomers or polymers suitable in the present invention can be generally prepared by condensation reactions between acrylic acid and hydroxyfunctional polyether compounds or alkoxylated multifunctional alcohols, respectively. Examples of useful acrylated polyethers compounds include those commercially available from UCB Radcure Inc. under the EBECRYL trade name (e.g. EBECRYL 12, EBECRYL 40 and EBECRYL 160) and Sartomer Co. under the trade name SARTOMER (e.g., SARTOMER SR 415 and SR 610). Acrylated polyether resins tend to improve the flexibility and elongation at break of the elastomeric material obtained by curing the UV-curable precursor. UV curable precursors which are preferred in the present invention comprise between 5 and 80 weight % and more preferably between 5 and 40 weight % of one or more polyether acrylate oligomers or polymers, respectively. Since polyether acrylate oligomers tend to exhibit a relatively low viscosity (such as, e.g., EBECRYL 160) such compounds are sometimes also referred to as reactive diluents.

Silicone acrylate oligomers or polymers useful in the present invention can be typically prepared by condensation reaction between acrylic acid and hydroxyfunctional silicones (e.g. $\alpha,\omega$-polydimethylsilicone diols). Due to their silicone backbone silicone acrylates tend to improve the elasticity and elongation of the structured surfaces but impair their tensile strength and robustness. Higher functional silicone acrylates are often used due to their low surface energy properties. Examples of useful silicone acrylates include those commercially available from Sartomer Co. under the trade name SARTOMER (e.g., SARTOMER CN 9800), UCB Radcure Inc. under the EBECRYL trade name (e.g. EBECRYL 350, EBECRYL 1360 and as methacrylates from Shin-Etsu Silicones Europe B.V. under the product name X-22 (e.g., X-22-164, X-22-164A).

The mechanical properties of the resulting structured surface of the present invention is affected not only by the chemical composition of the curable oligomer or polymer but also by the respective crosslink density. A higher cross-linking density usually results in a harder and more brittle material whereas a lower cross-linking density results in a softer and more conformable material.

The UV-curable precursor of the polymeric material comprised in the structured surface of the present invention preferably comprises between 2 to 40 weight %, more preferably between 2 and 25 weight % and especially preferably between 4 and 15 weight % of one or more reactive diluents. The cross-linkable oligomer and/or polymer compounds are preferably soluble in the one or more reactive diluents. Suitable reactive diluents are polymerizable with the oligomer and/or polymer compounds to form the copolymerized elastomeric network of the cured polymeric material of the structured surface of the present invention.

Preferably, the reactive diluents are free-radically polymerizable monomers and include, for example, ethylenically-unsaturated monomers such as acrylates, methacrylates, styrene, vinyl acetate; and the like, and mixtures thereof. Preferred monomers include (meth)acryloyl-functional monomers such as, for example, alkyl (meth)acrylates, aryloxyalkyl (meth)acrylates; hydroxyalkyl (meth)acrylates, and combinations thereof.

Representative examples of suitable monomers include methyl acrylate, ethyl acrylate, n-butyl acrylate, isobutyl acrylate, t-butyl acrylate, ethyl methacrylate, butyl methacrylate, ethyltriglycol methacrylate, isobornyl acrylate, 2-(((butylamino)carbonyl)oxy)ethyl acrylate, acetoacetoxyethyl methacrylate, acetoacetoxyethyl acrylate, acetoacetoxypropyl acrylate, acetoacetoxybutyl acrylate, 2-methyl-2-(3-oxo-butyrylamino)-propyl methacrylate, 2-ethylhexyl acrylate, n-octyl acrylic acetate, decyl acrylate, lauryl acrylate, stearyl acrylate, 2-hydroxyethyl acrylate, 2-hydroxypropyl acrylate, 2-hydroxyethyl methacrylate, 2-hydroxypropyl methacrylate, β-ethoxyethyl acrylate, 2-cyanoethyl acrylate, cyclohexyl acrylate, diethyl aminoethyl acrylate, hexyl methacrylate, decyl methacrylate, tetrahydrofurfuryl methacrylate, lauryl methacrylate, stearyl methacrylate, phenylcarbitol acrylate, nonylphenyl carbitol acrylate, nonylphenoxy propyl acrylate, 2-phenoxyethyl methacrylate, 2-phenoxypropyl methacrylate, N-vinyl pyrrolidone, polycaprolactam acrylate, acryloyloxyethyl phthalate, acryloyloxy succinate, 2-ethylhexyl carbitol acrylate, ω-carboxy-polycaprolactam monoacrylate, phthalic acid monohydroxyethyl acrylate, styrene, vinyl acetate, vinyl toluene, α-methyl styrene, acrylonitrile, glycidyl methacrylate, n-methylol acrylamide-butyl ether, n-methylol acrylamide, acrylamide, dicyclopentenyloxyethyl acrylate, dicyclopentenyl acrylate, dicyclopentenyloxyethyl acrylate, and the like, and mixtures thereof. Preferred monomers include isobornyl acrylate, isobornyl methacrylate, decyl acrylate, lauryl acrylate, stearyl acrylate, 2-hydroxyethyl methacrylate, 2-hydroxypropyl methacrylate, decyl methacrylate, tetrahydrofurfuryl methacrylate, lauryl methacrylate, stearyl methacrylate, phenylcarbitol acrylate, nonylphenyl carbitol acrylate, nonylphenoxy propyl acrylate, 2-phenoxyethyl methacrylate, 2-phenoxypropyl methacrylate, and the like, and mixtures thereof, with tetrahydrofurfuryl methacrylate, 2-phenoxyethyl methacrylate, 2-phenoxypropyl methacrylate, 2-hydroxyethyl methacrylate, 2-hydroxypropyl methacrylate, and mixtures thereof being more preferred.

If desired, multifunctional ethylenically unsaturated monomer(s) (compounds possessing at least two polymerizable double bonds in one molecule, for example, multifunctional acrylates or methacrylates) can be utilized to steer the degree of cross-linking. Representative examples of such multifunctional monomers include ethylene glycol diacrylate; 1,2-propylene glycol diacrylate; 1,3-butylene glycol diacrylate; 1,6-hexanediol diacrylate; neopentylglycol diacrylate; trimethylolpropane triacrylate; polyoxyalkylene glycol diacrylates such as dipropylene glycol diacrylate, methylene glycol diacrylates, tetraethylene glycol diacrylates, and polyethylene glycol diacrylate; ethylene glycol dimethacrylate; 1,2-propylene glycol dimethacrylate; 1,3-butylene glycol dimethacrylate; 1,6-hexanediol dimethacrylate; neopentylglycol dimethacrylate; bisphenol-A-dimethacrylate; diurethane dimethacrylate; trimethylolpropane trimethacrylate; polyoxyalkylene glycol dimethacrylates such as dipropylene glycol dimethacrylate, methylene glycol dimethacrylates, tetraethylene glycol dimethacrylates, and polyethylene glycol dimethacrylate; N,N-methylene-bis-methacrylamide; diallyl phthalate; triallyl phthalate; triallyl cyanurate; triallyl isocyanurate; allyl acrylate; allyl methacrylate; diallyl fumarate; diallyl isophthalate; diallyl tetrabromophthalate; ditrimethylolpropane tetraacrylate; dipentaerythritol pentaacrylate; and the like; and mixtures thereof.

Especially preferred reactive diluents are selected from a group of substances comprising hexane diol diacrylate, tetrahydrofuran acrylate, isobornyl acrylate (IBOA), tripropylen glycol diacrylate (TPGDA), hydroxyethyl acrylate (HEA) or 2-ethyl hexyl acrylate.

The hydrophobic properties of the micro- and/or nano-structured surfaces of a preferred embodiment of the present invention mainly depend on the properties of the polymeric material comprised in the structured surface such as, e.g., the surface energy of the polymeric material, and on the geometrical properties of the structured surface such as, e.g., the density and the arrangement of the micro- and/or nano-scale surface elements on the surface. It was found by the present inventors that the precursors of the polymeric materials are preferably selected so that a cured unstructured surface comprising the polymeric material obtained by curing the precursor, exhibits a contact angle against water of at least 70°, more preferably of at least 80° and especially preferably of at least 85°. If desired the contact angle of the unstructured surface against water can be increased by including one or more hydrophobic additives into the precursor. Additives providing hydrophobicity are typically selected from a group comprising silicones, silicone-based materials, fluorinated materials or long-chain alkyl compounds which can be non-reactive or reactive in terms of radiation curing. Reactive additives typically contain one or more ethylenically unsaturated groups such as acrylate groups, methacrylate groups, or vinyl groups. The hydrophobic additives are preferably selected from a group of compounds comprising silicon acrylates, silicone polyether acrylates, fluorinated and perfluorinated acrylates including perfluoroalkyl acrylates and fluorinated oligoethers.

Especially useful are UV-curable hydrophobic additives.

Silicone-based hydrophobic additives which are suitable in a preferred embodiment of the present invention are commercially available under the TEGO RAD series designation from Tego Chemie Service, Essen, Germany. Especially useful are TEGO RAD compounds 2100, 2200N, 2250, 2300, 2500 and 2600. Fluorinated hydrophobic additives useful in the present invention include perfluorinated (meth)acrylate compounds with shorter perfluoroalkyl segments which are preferably derived from perfluorobutanesulfonyl fluoride or perfluorooctanesulfonyl fluoride. N-methyl-(perfluorobutanesulfonamido)-ethyl acrylate (MeFBSEA) the preparation of which is disclosed, for example, in Example 2, Part A & B of U.S. Pat. No. 6,664,354 is an example of a reactive hydrophobic monomer additive which is useful in the present invention. A perfluorinated oligomer which is obtained by polymerizing MeFBSEA is disclosed in the Example section below as F-additive A.

The UV-curable precursor of the polymeric material comprised in the structured hydrophobic surface of the present. invention preferably comprises between 0.05-10 weight %, more preferably between 0.1 and 7 weight % and especially preferably between 0.2 and 5 weight % of one or more hydrophobic additives.

The UV-curable precursor of the polymeric material comprised in the structured surface of the present invention comprises between 0.05-5 weight %, more preferably between 0.1 and 4 weight % and especially preferably between 0.2 and 3 weight % of one or more photo initiators.

The choice of a photo initiator is determined, for example, by the radiation source, the types of cross-linkable oligomers or polymer compounds employed and the thickness of the film or coating of the UV-curable precursor to be cured. Photo initiators are preferably selected such that they provide suitable surface curing, suitable curing of the bulk material and a suitable colour after curing.

Examples of such curing-enabling agents are photo initiators used for UV curing, such as DAROCUR 1173-2,2-dimethyl-2-hydroxy acetophenone; CAS No. 7473-98-5, or IRGACURE 819—phenyl bis(2,4,6-trimethyl benzoyl)phosphine oxide; CAS NO. 162881-26-7, or benzophenone (all available from Ciba Specialty Chemicals, Basel, Switzerland).

Other additives may be added to the curable precursor of the polymeric material that may provide certain desired properties to the polymeric material comprised in the durable micro- and/or nano-structured surface or that may allow for easier processing. Examples of such additives are colorants, rheology agents, levelling agents, anti-skin agents, UV stabilizers, anti-oxidants, and anti-foam additives.

The UV-curable precursor preferably forms a syrup of coatable viscosity of, for example, 300-20,000 cps (Brookfield) at 23° C.

Known curing methods include radiation curing such as UV-curing and electron beam curing. UV-curing methods preferably employ high intensity UV lamps having e.g. H-bulb spectra (commercially available, for example, from Fusion System GmbH, Chemnitz or Dr. Hoenle A G, Munich) or low intensity lamps which are commercially available, e.g., as Sylvania Phosphor or Osram UVB 40 W lamps.

A hydrophobic structured surface of the present invention comprising a plurality of micro-scale and/or nano-scale surface elements is preferably prepared by a method comprising the steps of
(i) providing a tool surface comprising a plurality of micro- and/or nano-structured surface elements forming the negative of the structured surface, and
(ii) replicating the structured surface from the tool surface by applying a UV- or electron beam curable precursor of a polymeric material onto the tool surface, radiation curing the precursor, and removing the replicated structured surface from the tool surface,
wherein the precursor is selected to provide upon curing a polymer material having 1) an elongation at break of at least 10%, 2) an irreversible plastic deformation (permanent set) of less than 2%, and 3) a tensile strength of at least 5 MPa, and wherein the structured surface has a static contact angle against water of at least 90°.

A scratch-resistant structured surface of the present invention comprising a plurality of micro-scale and/or nano-scale surface elements is preferably prepared by a method comprising the steps of
(i) providing a tool surface comprising a plurality of micro- and/or nano-structured surface elements forming the negative of the structured surface, and
ii) replicating the structured surface from the tool surface by applying a UV- or electron beam curable precursor of a polymeric material onto the tool surface, radiation curing the precursor, and removing the replicated structured surface from the tool surface,
wherein the precursor is selected to provide upon curing a polymer material having 1) an elongation at break of at least 10%, 2) an irreversible plastic deformation (permanent set) of less than 2%, and 3) a tensile strength of at least 5 MPa, and wherein the structured surface is essentially unchanged when being subjected to 10 rubbing cycles according to A.A.T.C.C. test method 8-1972 using a cotton cloth and a total stamp weight of 300 g.

The preparation of a tool surface suitable in the present invention is disclosed, for example, in US patent application WO 1999/055537A (Ylitalo) or in U.S. Pat. No. 6,641,767 (Zhang).

The surface of the tool preferably comprises a durable material that can mechanically withstand repeated replication steps and that does not chemically react with the precursor material which is used to make micro- and/or nano-structured surfaces according to the present invention. The tool surfaces preferably include nickel electroforms or nickel plated solid materials. The tool surface may also comprise polymeric materials such as polysilicones or polyolefines provided such polymeric materials are chemically sufficiently inert and do not chemically interact with the precursor applied to the tool surface.

The surface of the tool can be obtained, for example, by micro-machining of an unstructured metal surface. Examples of suitable micromachining techniques include micro-embossing or micro-grinding. Suitable methods for preparing structured surfaces furthermore include chemical methods such as chemical vapour deposition as is disclosed in U.S. Pat. No. 6,641,762 or by chemical etching providing, for example, a smaller-scale structure onto a larger-scale structure as is disclosed in WO 1999/055,537A (Ylitalo).

The micro- and, optionally, nano-structured surface obtained by replicating the tool surface is the negative of the tool surface. It is, however, also possible to obtain a positive replica of the tool surface by using the negative replica surface as a tool surface and replicating it in a subsequent step.

The precursor can be applied to the surface of the tool for example by casting. The casting temperature (determined by the temperature of the precursor material and the temperature of the surface of the tool) is advantageously chosen to adjust the viscosity of the precursor material so that it flows around and wets the surface features of the tool surface within a reasonable time. Then the precursor material is cured and thereby hardened.

It may be advantageous to cure the precursor material only partly before removing it from the tool, and resume curing to the fully cured polymeric material after having separated the partly-cured precursor material from the structured surface of the tool.

It may also be advantageous to cure the precursor under inert conditions, especially, if the surface of the tool comprises a silicone polymer.

The structured surface of the present invention may be provided, for example, as an exposed surface of a polymeric film. The thickness of the film preferably is between 1 µm and 10 mm and more preferably between 10 µm and 200 µm. It is also possible that both exposed major surfaces of such film are micro- and/or nano-structured surfaces of the invention.

The structured surfaces of the present invention can also form one or more surfaces of 3-dimensional articles such as, for example, the exposed surface of a car tire.

The durable, scratch-resistant structured hydrophobic surface according to the present application may have any macroscopic shape. It may for example be flat or curved in two or three dimensions, and it may be composed of essentially flat surface areas having different orientations.

An article comprising a durable, scratch-resistant structured hydrophobic surface of the present invention may also be attached to a substrate so that the article and the substrate form a composite article. The attachment may be provided in any suitable way, for example by way of an adhesive, or by way of static electric attraction between the article and the substrate, or by mechanical attachment, or by way of magnetic force.

The substrate may be a rigid substrate or a flexible substrate which is selected, for example, from substrates made of glass, polymer, metals, wood, stone, concrete, or any combination thereof.

DETAILED DESCRIPTION OF THE FIGURES

FIGS. 1a and 1b are micro-photographical views of an embodiment of a micro- and nano-scale surface of the present invention which can be characterized as a SonS-type structured surface having nano-scale surface elements which are arranged at the bottom surface between the rails.

FIG. 1a shows the micro-scale structure comprising a plurality of rails which are equidistantly arranged in parallel to each other. The height of the rails is approximately 170 μm, their width at the bottom is approximately 55 μm and the width at the top is approximately 23 μm. The pitch length in a direction normal to the longitudinal extension of the rails is 214 μm. The rails thus represent micro-scale surface elements. The extension of the rails in the longitudinal direction is macroscopic.

FIG. 1b shows the low-scale structure which is present on the bottom surface between the rails. The nano-scale surface elements like for example the dark areas have a typical size of about 150-250 nm. The micro- and nano-structured surface of FIGS. 1a and 1b can be obtained by replication from a micro- and nano-scale tool surface referred to above and below as "tool surface 2".

FIG. 2a and FIG. 2b are micro-photographical views of an embodiment of a micro- and nano-scale structured surface of the present invention which can be characterized as a SonS-type structured surface having nano-scale surface elements which are exposed.

FIG. 2a shows the micro-scale structure comprising a plurality of channel-type surface elements which are equidistantly arranged in parallel to each other. The depth of the channels is approximately 170 μm, their width at the bottom is approximately 23 μm and the width at the top is approximately 55 μm. The pitch length in a direction normal to the longitudinal extension of the channels is 214 μm. The channels thus represent micro-scale surface elements. The extension of the channels in the longitudinal direction is macroscopic.

FIG. 2b shows the low-scale structure which is present on the exposed surfaces of the rail-type surface elements between the channels. The nano-scale surface elements like for example the bright areas have a typical size of about 150-250 nm.

The micro- and nano-structured surface of FIGS. 2a and 2b can be obtained by replication from a micro- and nano-scale tool surface referred to above and below as "tool surface 1".

FIG. 3a and FIG. 3b depict the surface structure of an optical film product available from 3M Co. as Brightness Enhancement Film BEF II 90/24. This film which is used in this invention as tool surface 3 comprises micro-scale prismatic rail-type surface elements extending in a longitudinal direction. The surface of BEF II 90/24 is not a surface of the present invention; it is rather used as tool surface 3 from which micro-structured surfaces of the invention can be replicated.

FIG. 3a is a micro-photographical top view of structured tool surface 3 showing a reflection from the tips of rail-type surface elements having the shape of linear prisms. The rail-type surface elements macroscopically extend in a longitudinal direction. The tips of the prisms appear somewhat broader because the top view is slightly inclined relative to the normal of the structured surface so that reflections from the respective front sides of the prismatic rails are observed.

FIG. 3b shows a schematic cross-sectional view of the structured tool surface 3 (indicated by reference number 1) of FIG. 3a normal to the longitudinal direction. The rail-type surface elements have a triangular cross-section 2 which is 12 μm in height, and the tips of adjacent rails are separated by a distance of 24 μm. The cross-sections of the rail-type surface elements thus represent micro-scale surface elements. The structured tool surface 3 of FIGS. 3a and 3b does not comprise superimposed nano-scale surface elements.

FIGS. 4a and 4b are schematic views of a stamp tool made from aluminium suitable for performing the A.A.T.C.C. rubbing procedures RP-300 and RP-920 described in the test section below. FIGS. 4a and 4b, respectively, provide a schematic side-view and a schematic bottom view of the tool. The tool exhibits a fin 10 which is covered with a cotton cloth and brought in contact with the structured surface when performing the rubbing procedure. More details of the test procedure are given in the Example section below.

FIGS. 5a-5c depict embodiments of nano-scale structured surfaces after having subjected them to the RP-300 test procedure using a cotton cloth. The surface of FIG. 5a is a nano-structured surface of the present invention whereas the surfaces of FIGS. 5b and 5c are surfaces obtained in Comparative Examples.

FIG. 5a depicts an SEM photo (upper photo) and a photo taken by an optical camera (lower photo) of the structured surfaces of the present invention according to Example 6D after having subjected it to the surface treatment of the rubbing procedure RP-300 using a cotton cloth (10 rubbing cycles). Both the SEM and the optical photograph taken for the structured surface after the rubbing treatment essentially corresponded to the SEM and the optical photograph taken prior to such treatment. Thus the structured surface of Example 6D is essentially not affected by the rubbing procedure.

The SEM photograph shows the surface structure comprising a plurality of rail-type surface elements appearing bright which are equidistantly arranged in parallel to each other and macroscopically extend in their longitudinal direction. The rail-type surface elements are separated by channel-type surface elements which are also equidistantly arranged in parallel to each other and macroscopically extend in their longitudinal direction. The channel-type surface elements appear dark. The SEM photo was taken from the surface after the rubbing treatment. The SEM photo taken from said surface prior to the rubbing treatment showed that the structure of the surface of Example 6D did essentially not change as a result of the rubbing procedure.

The optical photograph taken shows a continuous interference spectrum which is observed when illuminating the structured surface of Example 6D subsequent to the rubbing procedure with a light source emitting white light in the visible range of the spectrum. The camera is arranged over the illuminated major side of the structured surface so that the structured surface is observed under reflection conditions. The interference spectrum results from the interaction of the light with the rail- and channel-type surface elements which both have a nano-scale cross-section normal to the longitudinal direction.

The interference spectrum observed is a continuous, undistorted visible spectrum ranging from blue to red indicating that the structured surface of Example 6D was not affected by the rubbing procedure.

FIGS. 5b and 5c each depict the corresponding SEM and optical photos, respectively, for the structured surface of Comparative Example 6 and for the structured surface of Comparative Example 7 after having subjected them to the surface treatment of the rubbing procedure RP-300 using a cotton cloth (10 rubbing cycles).

A comparison of the SEM photograph of FIG. 5b with that of FIG. 5a (which was taken for the surface of Example 6D after the rubbing treatment but corresponded to the SEM photo of the surface taken prior to such rubbing treatment) shows that the structured surface of Comparative Example 6 was severely damaged by the rubbing procedure. The rail-type surface elements were abraded and the surface was evened out in the area of rubbing. The damage can also be seen in the interference spectrum of the optical photograph.

The SEM photograph of FIG. 5c shows that the structured surface of Comparative Example 7 was likewise severely damaged by the rubbing procedure. The rail-type surface elements were folded over and pressed into the adjacent channel-type surface elements. The damage can also be seen in the interference spectrum of the optical photograph.

FIGS. 6a to 6b show microphotographs of the tool surface 4B at different magnifications. The height of the protruding surface elements and the width of the upper plateau of such elements each is 300 nm. The width of the valleys likewise is 300 nm so that a pitch length of 300 nm results.

The following Examples will illustrate specific embodiments of the invention. They shall not be understood to limit the scope of the invention in any way.

EXAMPLES

Materials Used in the Examples

A. Crosslinkable Oligomers and/or Polymer Compounds
  GENOMER 4316, aliphatic trifunctional polyurethane acrylate, viscosity 58,000 mPas (milli-Pascal seconds) at 25° C., glass transition temperature $T_g=4°$ C. (commercially available from Rahn A G, Zurich, Switzerland)
  EBECRYL 1608, a bisphenol A epoxy diacrylate, MW 500, viscosity 1,000 mPas at 60° C. (available commercially from UCB Chemicals, Brussels, Belgium)
  EBECRYL P115, a co-polymerizable tertiary amine co-initiator (available commercially from UCB Chemicals, Brussels, Belgium)
  CN-UVE 151 M, an epoxy diacrylate oligomer, $T_g=51°$ C., viscosity 150,000 mPas at 40° C. (commercially available from Cray Valley, Paris, France)
  SARTOMER 399, dipentaerythritol penta acrylate (commercially available from Cray Valley, Paris, France
  VTR 750, a two-component silicone resin comprising 100 parts VTV750 and 10 parts catalyst CAT 750 (commercially available from MCP HEK Tooling GmbH, Lubeck, Germany).
  Resin 6130, a two-component polyurethane resin, comprising 50 parts 6130A polyether polyol, and 50 parts 6100B methylene diphenyl diisocyanate (commercially available from MCP HEK Tooling GmbH, Lübeck, Germany)
  SYLGARD 184, a two-component silicone elastomer, (mixing ratio A:B 10:1), where component A is a silicone, component B is a silicone resin solution containing 2% tetramethyltetravinylcyclosiloxane (commercially available from Dow Corning, Seneffe, Belgium).

B. Reactive Diluents
  HDDA—hexane diol diacrylate
  SR 285, a tetrahydrofuran acrylate (abbreviated as THF acrylate) which is commercially available from Cray Valley, Paris, France.

C. Photoinitiators
  DAROCUR 1173, 2,2-dimethyl-2-hydroxy acetophenone; CAS No. 7473-98-5 (Ciba Specialty Chemicals, Basel, Switzerland)
  IRGACURE 819, phenyl bis(2,4,6-trimethyl benzoyl) phosphine oxide; CAS NO. 162881-26-7 (Ciba Specialty Chemicals, Basel, Switzerland)
  benzophenone (commercially available from Sigma-Aldrich Chemie GmbH, Steinheim, Germany)

D. Hydrophobic Additives
  RAD 2300, silicone polyether acrylate (commercially available from TEGO Chemie Service GmbH, Essen, Germany)
  Perfluorinated additive A (referred to below as FAD A): perfluorinated oligomer prepared by conducting a radical polymerization of N-methyl-(perfluorobutane-sulfonamido)ethyl acrylate (MeFBSEA) in the presence of 2-mercaptoethanol (HSCH2CH2OH) in a mole ratio of 4:1. The polymerization was conducted in ethyl acetate using a free-radical initiator to give a mono OH functional oligomer. One mole free OH group of reaction product was reacted with one mole of isophorone diisocyanate (IPDI) in solvent to provide mono-isocyanate functionality. HOEA (hydroxyethylacrylate) was then reacted with the isocyanate to form an acrylate-capped material.

E. Base Formulations
  Base formulation A
  GENOMER 4316 (94 weight percent) ("wt %"), THF-acrylate (5 wt %) and DAROCUR 1173 (1 wt %) were combined to form base formulation A.
  Base formulation B
  GENOMER 4316 (92.5 wt %), THF-acrylate (5 wt %), DAROCUR 1173 (2 wt %) and IRGACURE 819 (0.5 wt %) were combined to form base formulation B.
  Base formulation C
  SARTOMER 399 (39.4 wt %), EBECRYL 1608 (23.3 wt %), EBECRYL P115 (3 wt %), HDDA (28.3 wt %), DAROCUR 1173 (4.5 wt %), and Benzophenone (1.5 wt %) were combined to form base formulation C.
  Base formulation D
  CN-UVE 151 M (82.5 wt %), THF acrylate (15 wt %), DAROCUR 1173 (2 wt %) and IRGACURE 819 (0.5 wt %) were combined to form base formulation D.
  Base formulation E
  Silicone resin VTV 750 (100 parts by weight) and CAT 750 (10 parts by weight) were mixed and cured over night to form base formulation E.
  Base formulation F
  Two component polyurethane resin (50 parts 6130A polyether polyol, 50 parts 6100B methylene diphenyl diisocyanate) were mixed and cured over night to form vacuum casting resin 6130, which formed base formulation F.
  Base formulation G
  The two components of silicone elastomer SYLGARD 184 were mixed at a mixing ratio A:B=10:1 to form base formulation G.

Tool Surfaces Used in the Examples to Generate the Structured Surfaces of the Invention Tool Surface 1

In a first step, a roll having a structured surface comprising both nano-scale and micro-scale surface elements was obtained by applying the method disclosed in WO 2007/011671, page 12, line 18-page 13, line 16 with the difference that the Ni-plating was applied first to the copper-plated steel roll with the grinding step being applied subsequently. Thus, a nano-scale Ni surface structure was first generated on the copper-plated steel roll. Then the roll was machined by a diamond tool to cut channels on the surface with the following size: top width of the channel was 55 micrometers, bottom width 23 micrometers wide, and height 170 micrometers. The pitch of the channel was 214 micrometers.

The resulting structure exhibited micro-channels with the top surfaces of the rails extending between the top widths of the channels each exhibiting a nano-scale Ni-plating structure.

The passage of WO 2007/011,671, page 12, line 18-page 13, line 16 is herewith incorporated by reference.

In a second step, the embossing roll described above was installed, together with a stainless steel nip roll, on a RCP 1.0 extruder made by Randcastle Extrusion System, Inc., Cedar Grove, N.J. and equipped with a flexible lip die. The temperature of the three adjustable heating zones of the extruder were set at 232° C. and the extrusion die temperature was set at 243° C. The rotation rate of the roll was 7 rpm. The top cooling flow rate was set at 10 to 20 gallons per minute (gpm, 38 to 76 liters/minute) and lower cooling flow rate at about 25 gpm (95 liters/minute). Polypropylene, obtained under the trade designation "POLYPROPYLENE 3155" from Exxon Chemical, Houston, Tex. was extruded onto the roll to generate a structured polymeric film. The surface structure of the structured polymeric film which is a negative replica of the surface structure of the embossing roll obtained in the first step above, corresponds to the surface shown in FIGS. 1a and 1b. It can be seen from FIG. 1a that the tool surface 1 has a plurality of micro-scale rail-shaped surface elements. The longitudinal extension of the rails was macroscopic along the face length (width) of the roll. The cross-sectional view of FIG. 1a shows that the rails have a microscopic scale normal to the width. The height of the rails was approximately 170 μm. The rails were tapered from bottom (approx. 55 μm wide) to top (approx. 23 μm wide). The rails were separated at their respective bottoms by a distance of about 214 μm (so-called pitch or pitch length).

The polymeric replica film (=tool surface 1) having the structure of the surface of FIG. 1a further exhibited nano-scale surface elements on its bottom surface extending between the respective bottoms of the rails. The surface structure of the polymeric replica film between the bottoms of the rails corresponds to the structure shown in FIG. 1b.

The polymeric replica film thus obtained was used as a tool surface 1 in the Examples below to prepare structured surfaces of the present invention. The corresponding structured surfaces of the invention obtained from tool surface 1 were thus positive replica of the surface of the embossing roll and had the structure shown in FIGS. 2a and 2b.

Tool surface 2

A thermally curable silicone material (VTV 750 two-component silicone resin from NCP Tooling Technologies, Lubeck, Germany) was cast onto the tool surface 1 described above and cured over night at room temperature. The silicone surface thus obtained which corresponds to the surface shown in FIGS. 2a and 2b comprises micro-scale channels separating micro-scale rail-shaped elements extending macroscopically in one direction. The top width of the channels was approx. 55 μm, the bottom width approx. 23 μm and the depth approx. 170 μm. The bottom width of the rail-shaped surface elements corresponding to the pitch length of the channels was about 214 μm. The exposed surface of the rail-shaped surface elements comprised a nano-scale surface structure corresponding to the structure shown in FIG. 2b.

The silicone surface thus obtained was used as a tool surface 2 in the Examples below to prepare structured surfaces of the present invention. The corresponding structured surfaces of the invention were thus negative replica of the embossing roll and had the structure shown in FIGS. 1a and 1b.

Tool surface 3

The micro-structured surface of an optical film commercially available under the trade designation Brightness Enhancement Film BEF II 90/24 from 3M Company, St. Paul, Minn., U.S.A. formed tool surface 3 used in the present invention.

The micro-structured surface of the commercially available optical film is shown in FIGS. 3a and 3b. The micro-structured surface comprises a plurality of linear prismatic rows extending on a macro-scale in parallel to each other on a plane surface. The spacing between the vertices of two adjacent parallel linear prisms was approx. 24 μm, and the height of the prisms was approx. 12 μm. The tool surface 3 had no nanometer-sized surface features superimposed.

Tool surfaces 4A-4D

A copper-plated steel substrate (dimensions (350 μm×150 mm×approx. 800 mm) for each of the four patterns was precision machined to get a smooth surface with a roughness Ra of less than 100 nm. The steel substrate was sprayed with Petroleum Naphtha (obtained from Brenntag Great Lakes Company, St. Paul, Minn.) for one minute, followed by spraying with acetone for one minute. The substrate was rinsed with water and then sprayed with iso-propanol. After the surface had been blown dry with compressed air, the plate was plated in a bath composed of: 50 grams/liter of copper sulfate, 80 grams/liter of sulfuric acid, and 2 grams/liter of polyethylene oxide. A current of 54 amperes was applied for 0.5 minutes at 19° C. The substrate was rinsed with de-ionized water and dried by compressed air. A uniform surface structure was formed. After this structure was obtained, the substrate was machined by a diamond tool to cut linear nano-scale channels on the surface each having a rectangular cross-section. Four different diamond tools were used to create four different diamond tool cutting profiles resulting in four different structured surfaces. Each diamond tool provided linear nano-scale channels on the respective structured surfaces arranged in each case parallel to each other. The channels exhibited in each case a rectangular cross-sectional profile normal to the linear extension. The diamond tools were made by using a focused ion beam milling process which is disclosed, for example, in Y. N. Picard et al.; Precis. Eng. 27 (2003), pp. 59-69.

The four structured surfaces obtained by diamond tool cutting were plated with electrolytic nickel to a thickness of approx. 25 mils. The nickel plating was performed in two steps consisting of a preplate of 6 hours with a low deposition rate to ensure that a uniform layer of nickel was established, followed by a more rapid deposition to achieve the target thickness value of 25 mils. The electroforming yielded the tool surface 4A-4D each having a multitude of linear channels arranged parallel to each other wherein the channels each exhibit a cross-sectional profile normal to the linear extensions of the channels with the following dimensions:

| Tool surface | Pitch length [nm] | Width of valley [nm] | Width of upper platform [nm] | Depth of channel [nm] |
|---|---|---|---|---|
| 4A | 300 | 150 | 150 | 150 |
| 4B | 600 | 300 | 300 | 300 |
| 4C | 600 | 300 | 300 | 450 |
| 4D | 600 | 300 | 300 | 600 |

The tool surfaces 4A-4D were used to prepare structured surfaces of the present invention as is described below.

FIGS. 6a and b show microphotographs of the tool surface 4B at different magnifications.

Test Methods

A. Bulk Material Properties

1. Tensile Strength and Elongation at Break

Tensile strength and elongation at break were measured according to Deutsche Industrie Norm (DIN EN ISO 527-1 and 527-3) with the following modifications. The thickness of the sample was approximately 150 µm. The samples were created using a dumbbell die "C".

The sample was clamped at a distance of 80 mm. The length of sample that was measured was 30 mm. The crosshead speed was 50 mm/min. The test was repeated five times, each time with a new sample.

2. Permanent Set

Permanent set was measured according to American Society of Testing and Materials (ASTM) Method D 412-98a (2002) with the following modifications. Sample preparation: The thickness of the sample was approximately 150 µm. The samples were created using a dumbbell die "C".

Measurement: The sample was clamped at a distance of 80 mm. The initial length of distance L(0) on sample to be measured was 50.8 mm (two marks were placed on the sample at a distance of 50.8 mm from one another.)

The crosshead speed during elongation was 50 mm/min. The amount of elongation during each elongation cycle was 20% of the distance between the clamps. The sample was elongated and then held at the extended position for five minutes. The crosshead was then returned to the original position at a rate of 50 mm/min. The sample was allowed to relax for 5 minutes while still clamped in the apparatus. The procedure was then repeated one time. Thus there were two complete extension and relaxation cycles. The entire test was then repeated for 4 additional samples and the results were averaged.

The calculation was done using equation 5 of the test method ASTM D 412-98a; 13.5:

$$E = 100[L - L(0)]/L(0)$$

wherein

E is the permanent set in percent,

L is final length between the two samples marks in mm after two extension cycles, and L(0) is the initial length in mm between the two sample marks, and was set as 50.8 mm.

B. Tests on Unstructured Surfaces

1. Contact Angle, Static (Water)

The test was performed according to the International Standard ISO 15989 with the following modifications.

The contact angle was measured using Goniometer ERMA Contact Angle Meter G-1. 10 µl droplets were applied to the surface at 23° C. The contact angle was measured after 20 sec. Five measurements were made and the results were averaged.

2. Pencil Hardness (Ericson Test)

The test was performed according to American Society of Testing and Materials (ASTM) D 3363-5 on unstructured surfaces.

The unstructured surface was scratched with pencils having varying degrees of hardness. Each sample was scratched one time using an angle and weight as described in the ASTM standard. After the surface was scratched, the sample was removed from the testing equipment and cleaned with a soft cloth to remove any residual graphite. The surface was examined visually to determine whether a streak was visible or whether the surface had been physically damaged. Pencils having a hardness of 6B (softest) to 9H (hardest) were employed, starting with the softest. The result of the test is providing by reciting the pencil with the highest hardness that did not leave permanent and visible damage was recorded.

3. Abrasion Tests Applied on Unstructured Surfaces a) Rubbing procedure "RP-300" employing a cotton cloth or a stainless steel wool, respectively A sample of a film having an exposed unstructured surface was adhered to a glass plate using a double-sided adhesive tape. The sample had the dimensions of 4.0 cm×12.8 cm. The plate was mounted in an American Association of Textile Chemists and Colorists (A.A.T.C.C.) crockmeter which is commercially available as Model CM5 from Atlas Electric Devices Co (Chicago, Ill., USA).

The rubbing test was performed according to A.A.T.C.C. test method 8-1972 with the following modifications. A cotton cloth or a stainless steel wool grade #0000, respectively, was used as the rubbing cloth. The stainless steel wool grade #0000 was commercially available under the designation "1113-Magic Sand" from www.hutproducts.com. The stamp design was modified to allow for a better correlation with scratching that might be observed under wear conditions. The stamp was placed in the Crockmeter so that the fin was in contact with the surface to be tested. The fin 10 of the stamp was aligned so that the long axis of the fin 10 was perpendicular to the direction of rubbing. FIGS. 5a and 5b show the shape of the stamp bearing the fin 10.

The fin was 4 mm wide and had a height of 5 mm. The portion of the fin that faced the test surface was semicircular in shape so that the surface was contacted by the uppermost part of the semi-circle. The length of the fin was 25.4 mm. The end of the stamp, including the fin, was covered with a cotton rag or with the stainless steel wool grade #0000, respectively, during the test. The weight of the stamp was 47.5 g. The total overlying weight (lever arm and stamp) was 300 g.

A rubbing cycle consisted of a complete cycle of moving forward and moving backward.

4. Determination of the Surface Roughness of Unstructured Surfaces

A sample of a film having an exposed unstructured surface was placed on a glass plate using a double-sided adhesive tape. The sample had the dimensions of 4.0 cm×8 cm.

The measurements were conducted under ambient conditions using a Tester T 500 available from Hommelwerke GmbH, Germany. The measurements were conducted according to DIN 4772 using a set test distance of 4.8 mm.

Ra, Rmax and Rz were determined for each sample at 5 different locations on the film. In case of structured surfaces comprising surface elements macroscopically extending in a first direction and extending on a nano- or micrometer scale in a direction normal to that first direction, the roughness values Ra, Rmax and Rz were measured both in a direction parallel to the first direction and in a direction normal to the first direction.

C. Tests on Structured Surfaces

1. Static Contact Angle (Water)

The test was performed according to the International Standard ISO 15989 with the following modifications.

The contact angle was measured using Goniometer ERMA Contact Angle Meter G-1. 10 µl droplets were applied to the surface at 23° C. The contact angle was measured after 20 sec. Five measurements were made and the results averaged.

In case of structured surfaces comprising surface elements macroscopically extending in a first direction and extending on a nano- or micrometer scale in a direction normal to that first direction, the contact angle was measured both in a direction parallel to the first direction and in a direction normal to the first direction. Five measurements were made both in the first direction and in the direction normal to the first direction, and the results were averaged. The static contact angle is obtained as the arithmetic average of the values of the static contact angle measured in the first direction and in a direction normal thereto, respectively.

2. Determination of the Surface Roughness of Structured Surfaces

A sample of a film having an exposed structured surface was placed on a glass plate using a double-sided adhesive tape. The sample had the dimensions of 4.0 cm×8 cm. The surface roughness values Ra, Rmax and Rz were determined as is described in Test Section B.4. above.

3. Abrasion Tests Applied to Structured Surfaces a) Rubbing procedure "RP-300" employing a cotton cloth or a stainless steel wool, respectively A sample of a film having an exposed structured surface of the present invention was adhered to a glass plate using a double-sided adhesive tape. The sample had the dimensions of 4.0 cm×12.8 cm. The plate was mounted in an American Association of Textile Chemists and Colorists (A.A.T.C.C.) crockmeter which is commercially available as Model CM5 from Atlas Electric Devices Co (Chicago, Ill., USA).

The rubbing test was performed according to A.A.T.C.C. test method 8-1972 with the following modifications. A cotton cloth or a stainless steel wool grade #0000, respectively, was used as the rubbing cloth. The stainless steel wool grade #0000 was commercially available under the designation "1113-Magic Sand" from www.hutproducts.com. The stamp described in test section B.3 above and shown in FIGS. 5a and 5b was used.

A rubbing cycle consisted of a complete cycle of moving forward and moving backward. For linear structures comprising surface elements macroscopically extending in a first direction the rubbing direction preferably is normal to such first direction because the scratch-resistance of the structured surface tends to be higher in the first direction than in a direction normal thereto so that performing the rubbing mainly in a direction normal to the first direction tends to be more demanding.

b) Rubbing Procedure "RP-920"

This rubbing procedure was identical to the procedure RP-300 described above with the following two modifications:

The total overlying weight (lever arm and stamp) was 920 g, and the end of the stamp, including the fin, was covered with a High-Performance Microfiber cloth, available from 3M Company, St. Paul, Minn., U.S.A., under the designation "Microfiber Multipurpose Cloth 2030".

4. Tests Performed on Abraded Structured Surfaces

Structured surfaces which had been subjected to abrasion tests as described in section C.2 above were tested using the following test methods.

4.1 Static Contact Angle on Abraded Structured Surfaces (Water)

The contact angle was measured using the method described in section C.1 above, and the results were averaged.

4.2 Droplet Roll-Off Test

This test was performed on structured surfaces in their initial condition and after various numbers of Crockmeter rubbing cycles, respectively, applied as described in section C.2 above. A sample of the film with an exposed structured surface to be tested was laid on a support and tilted at an angle of 10°. Three sizes of water droplets were applied to the surface in sequence: 0.035 ml, 0.050 ml and 0.070 ml. The droplets were given the designations: 0.035 ml="small", 0.050 ml="medium", 0.070 ml="large". The larger the droplet, the more likely it is to roll off the surface, due to its weight.

The properties of the structured surfaces were rated in the following manner:

Repellence Rating 1 (best rating):

Small, medium and large drops were repelled from the structured surface and rolled off.

Repellence Rating 2:

Medium and large drops were repelled and rolled off, small drops remained on the structured surface.

Repellence Rating 3:

Only the large drop rolled off, small and medium drops remained on the structured surface.

4.3 Interference Spectra

This test was performed on structured surfaces in their initial condition and after various numbers of Crockmeter rubbing cycles applied as described in section C.2 above.

The samples of structured surfaces were placed on a matte black surface and were illuminated by a CCFL type light source (Osram Coolwhite L36W/21-840) arranged at a distance of 2 m above the sample. Under these conditions the unabraded structured surfaces, i.e. the structured surfaces in their initial state, displayed a continuous interference spectrum in the visible range (reflection mode). The damage created at a structured surface after various numbers of Crockmeter rubbing cycles applied as described in section C.2 above, could be qualitatively assessed by comparing the interference spectra displayed by a structured surface in its initial or abraded state, respectively.

Photographs of the interference spectra were taken using a Panasonic DMC-FX12digital camera at a distance of approximately 30 cm.

4.4. SEM Microphotographs

SEM photos were taken from the structured surfaces in their initial or abraded state, respectively. The SEM photos were taken with a Quanta 400 scanning electron microscope from FEI Comp., Hilsboro, Oreg., U.S.A. The magnification used is indicated in each case on the SEM microphotographs taken.

EXAMPLES

Comparative Example 1

Precursors comprising a base formulation and a hydrophobic additive in a concentration as indicated in Table 1 were coated onto a PET film MELINEX 505 film substrate as obtained from DuPont Teijin Films Luxembourg S.A. The coating layer had a thickness of 50 μm and exhibited a smooth, unstructured outer surface.

The coated precursor was cured by irradiating it under nitrogen with a UV-dosage of about 900 mJ/cm² using a UV-H bulb. Subsequently, the precursor was exposed for 5 min. to UV light using UV tube lamp Osram UVB (40 W) in order to ensure an essentially complete curing of the precursor film.

The exposed surface of the cured film was used as an unstructured surface and evaluated with respect to its visual appearance and its static contact angle against water. The results are summarized in Table 1 below.

The exposed surfaces of three of the cured, unstructured films specified in Table 1 were treated in each case with the rubbing procedure described in test section B.3 for unstructured surfaces employing the stainless steel wool rag. The visual appearance of the surface after such treatment was qualitatively assessed. The results are summarized in Table 10 below.

The surface roughness was measured for two of the cured, unstructured films specified in Table 1. The results of the roughness measurements are summarized in Table 11 below.

Example 1

Base formulation A (98 weight %) was mixed with 2 weight % perfluorinated additive A (FAD A) to form a slightly hazy homogeneous precursor upon stirring.

The precursor was coated on a glass substrate or a polymer sheet substrate such as MELINEX 505 in a thickness of 100-150 μm using a doctor blade. The precursor layer was cured by exposure to UV-H light for a total UV exposure dosage of 900 mJ/cm². Further curing was done for 5 minutes with UV tube lamp Osram UVB (40 W) under a nitrogen blanket in order to ensure complete surface curing. The exposed surface of the cured film was used as an unstructured surface and tested using the test methods specified above.

An appropriate quantity of the precursor was poured at room temperature onto the surface of the silicone tool surface 2 described above, and covered with a 100 μm thick polyethylene terephthalate (PET) film, namely MELINEX 505 from DuPont Teijin Films Luxembourg SA. The film was rolled with a rubber-coated hand roller so that the mixture was distributed uniformly over the casting surface at a thickness of about 300-400 μm. The complete film was cured through the polyester film by exposure to UV-H light for a total UV exposure dosage of 900 mJ/cm². Further curing was done for 5 minutes with UV tube lamp Osram UVB (40 W) under a nitrogen blanket to ensure complete curing. The PET film bearing the structured surface according to the invention was then peeled off from the silicone tool. The film was colourless, but slightly hazy. The exposed surface of the film represented a structured surface of the present invention which was tested using the test methods specified above. The rail-shaped, micro-scale surface elements of the structured structure were visible to the naked eye.

The test results are summarized in Tables 2 through 7.

Example 2

Example was repeated with the exception that the precursor consisted of 98 weight % of Base Formulation B and 2 weight % of perfluorinated additive A (FAD A).

The test results are summarized in Tables 2 through 7.

Example 3

Example 1 was repeated with the exception that the precursor consisted of 98 weight % of Base Formulation A and 2 weight % of hydrophobic additive Rad 2300.

The test results are summarized in Tables 2 through 7.

Example 4

Example 1 was repeated with the exception that the precursor consisted of 98 weight % of Base Formulation B and 2 weight % of hydrophobic additive Rad 2300.

Comparative Example 2

Example 1 was repeated with the exception that the precursor consisted of 98 weight % of Base Formulation C and 2 weight % of perfluorinated additive A (FAD A).

The test results are summarized in Tables 2 through 7.

Comparative Example 3

Example 1 was repeated with the exception that the precursor consisted of 98 weight % of Base Formulation D and 2 weight % of perfluorinated additive A (FAD A).

The test results are summarized in Tables 2 through 7.

Comparative Example 4

Example 1 was repeated with the exception that the precursor consisted of 100 weight % of Base formulation F with no hydrophobic additive being added.

The test results are summarized in Tables 2 through 7.

Comparative Example 5

Example 1 was repeated with the exception that the precursor consisted of 100 weight % of Base formulation G with no hydrophobic additive being added.

The test results are summarized in Tables 2 through 7.

Example 5

Example 1 was repeated with the exception that the precursor consisted of 98 weight % of Base Formulation A and 2 weight % of perfluorinated additive A (FAD A) and that tool surface 1 was used.

The test results are summarized in Tables 2 through 7.

Examples 6A-6D

Example 1 was repeated with the exceptions that tool surfaces 4A-4D, respectively, were used instead of tool surface 2 and that the precursor consisted of 98 weight % of Base Formulation A and 2 weight % of hydrophobic additive RAD 2300.

The static contact angles (water) were measured as described in section C.1 of the Test Methods. The results are summarized in Table 8.

After having subjected the structured surface of Example 6D to the rubbing procedure RP-300 the structured surface treated was qualitatively evaluated by examining its visual appearance to the naked eye, by taking photographs as described in section C.3.3 of the Test Methods and by taking SEM photos as described in section C.3.4 of the Test Methods.

FIG. 5a shows an SEM photo (upper photo) and a photo taken by an optical camera (lower photo) of the structured surface of Example 6D after having treated it with 10 rubbing cycles of rubbing procedure RP-300 using the cotton rag. These photos essentially correspond to the SEM photo and the photo of the interference spectrum taken prior to the rubbing treatment. Thus the rubbing procedure does essentially not change the structured surface of Example 6D.

The visual appearance of the structured surface of Example 6D was also evaluated after 100 and 1000 rubbing cycles of rubbing procedure RP-300 using the cotton rag. The results are summarized in Table 9.

The visual appearance of the structured surface of Example 6D was furthermore evaluated after 10 rubbing cycles of rubbing procedure RP-300 using stainless steel wool grade #0000. This rubbing procedure did essentially not create any visual damage on the structured surface of Example 6D.

Comparative Example 6

Example 6D was repeated with the exception that the precursor consisted of 98 weight % of Base Formulation C and 2 weight % of hydrophobic additive RAD 2300.

After having subjected the structured surface thus obtained to the rubbing procedure RP-300 using the cotton rag it was qualitatively evaluated by visual inspection, by taking photographs as described in section C.3.3 of the Test Methods and by taking SEM photos as described in section C.3.4 of the Test Methods.

FIG. 5b shows an SEM photo (upper photo) and a photo taken by an optical camera (lower photo) of the structured surface of Comparative Example 6 after having it subjected to 10 or 100 rubbing cycles, respectively, of rubbing procedure RP-300 using the cotton rag. It can be seen from a comparison with FIG. 5a (which represents the surface of FIG. 5b prior to the surface treatment) that this rubbing procedure heavily distorted the structured surface of Comparative Example 6.

The visual appearance of the structured surface of Comparative Example 6 after the above rubbing treatment is also reported in Table 9.

Comparative Example 7

Example 6D was repeated with the exception that the precursor consisted of 98 weight % Base Formulation D and 2 weight % of hydrophobic additive RAD 2300. After having subjected the structured surface thus obtained to the rubbing procedure RP-300 using the cotton rag it was qualitatively evaluated by visual inspection, by taking photographs as described in section C.3.3 of the Test Methods and by taking SEM photos as described in section C.3.4 of the Test Methods.

FIG. 5c shows an SEM photo (upper photo) and a photo taken by an optical camera (lower photo) of the structured surface of Comparative Example 7 after having it subjected to 10 or 100 rubbing cycles, respectively, of rubbing procedure RP-300 using the cotton rag. It can be seen from a comparison with FIG. 5a (which represents the surface of FIG. 5c prior to the surface treatment) that this rubbing procedure heavily distorts the structured surface of Comparative Example 7.

The visual appearance of the structured surface of Comparative Example 7 after the above rubbing treatment is also reported in Table 9.

Example 7

Example 1 was repeated with the exceptions that tool surface 1 was used instead of tool surface 2 and that the precursor consisted of 98 weight % of Base Formulation A and 2 weight % of hydrophobic additive RAD 2300.

The micro- and nano-structured surface obtained is a SonS surface having nano-scale surface elements on the protruding micro-scale surface elements. A SEM photograph of the structured surface obtained is shown in FIGS. 2a and 2b.

The static contact angles (water) were measured as described in section C.1 of the Test Methods. The results are summarized in Table 8.

The surface roughness values Ra, Rmax and Rz were measured for the SonS surface used in Example 7 both in a direction parallel to the direction of macroscopic extension of the rail-type surface elements and in a direction normal thereto. The results of the roughness measurements are summarized in Table 11 below.

Example 8

The surface roughness values Ra, Rmax and Rz were measured for tool surface 3 both in a direction parallel to the direction of macroscopic extension of the prismatic surface elements and in a direction normal thereto. The results of the roughness measurements for tool surface 3 (which is not a surface of the present invention) are summarized in Table 11 below.

TABLE 1

Film appearance and static contact angle against water of unstructured surfaces

| Base Formulation | Hydrophobic Additive | Concentration of Hydrophobic Additive [weight %] | Film Appearance | Static Contact Angle for water |
|---|---|---|---|---|
| C | None | — | Smooth, clear | 92° |
|   | FAD A | 2% | Smooth, clear | 93° |
|   | Rad 2300 | 2% | Smooth, clear | 102° |
| B | None | — | Smooth, clear | 69° |
|   | FAD A | 2% | Smooth, clear | 91° |
|   | Rad 2300 | 2% | Smooth, clear | 80° |
| D | None | — | Smooth, clear | 68° |
|   | FAD A | 2% | Smooth, hazy | 93° |
|   | Rad 2300 | 2% | Smooth, hazy | 86° |
| A | None | — | Smooth, clear | 72° |
|   | FAD A | 2% | Smooth, hazy | 92° |
|   | FAD A | 5% | Smooth, hazy | 93° |
|   | FAD A | 20% | Smooth, hazy | 87° |
|   | Rad 2300 | 1% | Smooth, clear | 74° |
|   | Rad 2300 | 2% | Smooth, hazy | 86° |

TABLE 2

Bulk and surface properties of unstructured surfaces obtained with polymeric materials used in the Examples indicated

| Example | Base Formulation | Curing Mechanism | Additive (wt %) | Static contact angle | Elongation at break, % | Permanent set, % | Ericson Pencil Test | Tensile Strength, MPa |
|---|---|---|---|---|---|---|---|---|
| 1 | A | UV | FAD A (2%) | 95° | 35 | 0.98% | 9H | 24 |
| 2 | B | UV | FAD A (2%) | 94° | 36 | 0.72% | 9H | 23 |
| 3 | A | UV | Rad 2300 (2 weight %) | 91° | 35 | — | — | — |
| 4 | B | UV | Rad 2300 (2 weight %) | 95° | 36 | — | — | — |
| 5 | A | UV | FAD A (2%) | 95° | 35 | 0.98% | 9H | 24 |
| C2 | C | UV | FAD A (2%) | 97° | <1 | n.m. | 8H | >1000 |
| C3 | D | UV | FAD A (2%) | 92° | 44 | 79% | B | 850 |
| C4 | F | Thermal | none | 72° | 200* | 4.13% | <6B | 16.5*** |
| C5 | G | Thermal | none | 91° | 109 | 0.92% | <6B | Approx. 2 |

*according to ISO R527 (from product literature)

***values from product literature

— not measured n.m. not measurable because sample was too brittle

TABLE 3

Static contact angle for water on structured surfaces

| Example | Base Formulation | Curing Mechanism | Additive (wt %) | Tool surface type | Static contact angle, water, ° |
|---|---|---|---|---|---|
| 1 | A | UV | FAD A (2%) | Tool surface 2 | 150° |
| 2 | B | UV | FAD A (2%) | Tool surface 2 | 148° |
| 3 | A | UV | Rad 2300 (2 weight %) | Tool surface 2 | 152° |
| 4 | B | UV | Rad 2300 (2 weight %) | Tool surface 2 | 148° |
| 5 | A | UV | FAD A (2%) | Tool surface 1 | 127° |
| C2 | C | UV | FAD A (2%) | Tool surface 2 | 150° |
| C3 | D | UV | FAD A (2%) | Tool surface 2 | 151° |
| C4 | F | Thermal | None | Tool surface 2 | 149° |
| C5 | G | Thermal | None | Tool surface 2 | 150° |

TABLE 4

Static contact angle on structured surface after having subjected it to rubbing procedure RP-300

| Example | 0 rub cycles | 5 rub cycles | 10 rub cycles | 20 rub cycles | 40 rub cycles | 60 rub cycles | 80 rub cycles | 100 rub cycles | 120 rub cycles |
|---|---|---|---|---|---|---|---|---|---|
| 3 | 150° | — | — | 150° | 150° | 150° | 150° | 150° | 150° |
| 4 | 148° | — | — | 146° | 146° | 145° | 144° | 144° | 144° |
| C2 | 151° | Structure destroyed, no angle measureable | — | — | — | — | — | — | — |
| C3 | 150° | 144° | 143° | 143° | 143° | 142° | 141° | 141° | 140° |
| C4 | 149° | — | — | 145°, some material abrasion | Structure destroyed No angle measureable | — | — | — | — |
| C5 | 150° | 149° | 149° | 148° | 146° | 146° | — | 144° | 144° |

— Not measured

TABLE 5

Roll-off from structured surface after having subjected it to rubbing procedure RP-300

Roll-off from 10° inclined surface

| Example | 0 rub cycles | 5 rub cycles | 10 rub cycles | 20 rub cycles | 40 rub cycles | 60 rub cycles | 80 rub cycles | 100 rub cycles | 120 rub cycles |
|---|---|---|---|---|---|---|---|---|---|
| 3 | 1 | — | — | 1 | 1 | 1 | 1 | 1 | 2 |
| 4 | 1 | — | — | 1 | 2 | 2 | 2 | 2 | 2 |
| C2 | 1 | surface completely destroyed | — | — | — | — | — | — | — |
| C3 | 1 | 1 | 2 | 2 | 2 | 2 | 2 | 3 | 3 |
| C4 | 1 | — | — | 3 | — | — | — | — | — |

— not measured

TABLE 6

Static contact angle on structured surface after having subjected it to rubbing procedure RP-920

Static contact angle

| Example | 0 rub cycles | 5 rub cycles | 10 rub cycles | 15 rub cycles | 20 rub cycles | 25 rub cycles | 30 rub cycles | 40 rub cycles | 50 rub cycles |
|---|---|---|---|---|---|---|---|---|---|
| 3 | 150° | 149° | 148° | 146° | 144° | 144° | 144° | 142° | 142° |
| 4 | 148° | 145° | 143° | 145° | 145° | 144° | 144° | 143° | 142° |
| C5 | 150° | Structure destroyed, due to abrasion | — | — | — | — | — | — | — |

— Not measured

TABLE 7

Roll-off from structured surface after having subjected it to rubbing procedure RP-920

Roll-off from 10° inclined surface

| Example | 0 rub cycles | 5 rub cycles | 10 rub cycles | 15 rub cycles | 20 rub cycles | 25 rub cycles | 30 rub cycles | 40 rub cycles | 50 rub cycles |
|---|---|---|---|---|---|---|---|---|---|
| 3 | 1 | 1 | 1 | 1 | 1 | 2 | 2 | 2 | 2 |
| 4 | 1 | 1 | 1 | 1 | 1 | 1 | 2 | 2 | 2 |
| C5 | 1 | Surface completely destroyed | — | — | — | — | — | — | — |

— not measured

TABLE 8

Static contact angle on structured surfaces

| | | | | | Contact angle | | |
|---|---|---|---|---|---|---|---|
| Example | Base formulation | Curing mechanism | Additive (weight %) | Tool surface type | in first direction (parallel to channels) | Normal to first direction (perpendicular to channels) | Average |
| 6A | A | UV | RAD 2300 (2 weight %) | 4A | 109.0 | 98.7 | 104 |
| 6B | A | UV | RAD 2300 (2 weight %) | 4B | 94.3 | 95.0 | 95 |
| 6C | A | UV | RAD 2300 (2 weight %) | 4C | 100.7 | 105.3 | 103 |
| 6D | A | UV | RAD 2300 (2 weight %) | 4D | 110.3 | 115.0 | 113 |
| 7 | A | UV | RAD 2300 (2 weight %) | 1 | 118.3 | 126.7 | 123 |

TABLE 9

Visual appearance on structured surfaces after having them subjected to rubbing procedure RP-300 using the cotton rag

| | Visual appearance | | |
|---|---|---|---|
| Example | 10 rub cycles | 100 rub cycles | 1000 rub cycles |
| 4 | ++ | ++ | *) |
| 6A | ++ | ++ | *) |
| 6B | ++ | ++ | *) |
| 6C | ++ | ++ | *) |
| 6D | ++ | ++ | + |
| C6 | -- | *) | *) |
| C7 | -- | *) | *) |

*) not measured
++ unscratched surface i.e. no scratches visible to the naked eye
+ slightly scratched surface
− strongly scratched surface
−− very strongly scratched surface

TABLE 10

Visual appearance on unstructured surfaces after having subjected them to rubbing procedure RP-300 using stainless steel wool grade #0000

| Example | BASE Formulation | Curing Mechanism | Additive [weight %] | Visual appearance 10 rub cycles |
|---|---|---|---|---|
| C1 | C | UV | RAD 2300 (2 weight %) | ++ |
| C1 | D | UV | RAD 2300 (2 weight %) | − |
| C1 | A | UV | RAD 2300 (2 weight %) | ++ |

++ unscratched surface i.e. no scratches visible to the naked eye
+ slightly scratched surface
− strongly scratched surface
−− very strongly scratched surface

TABLE 11

Surface roughness of unstructured and structured surfaces

| Example | Base formulation | Curing mechanism | Additive (weight %) | Tool surface type | Surface Roughness [μm] | | |
|---|---|---|---|---|---|---|---|
| | | | | | Ra | Rmax | Rz |
| C1 | A | UV | — | Unstructured Melinex 505 | 0.092 | 0.938 | 0.634 |
| C1 | — | UV | — | Unstructured Melinex 505 | 0.101 | 0.806 | 0.644 |
| 7 | A | UV | RAD 2300 (2 weight %) | Micro- and nanostructured (SonS) | Parallel to macroscopic rails | | |
| | | | | | 2.532 | 24.82 | 15.336 |
| | | | | | Normal to macroscopic rails | | |
| | | | | | 17.424 | 64.882 | 55.112 |
| 8 | — | — | — | Microstructured tool surface 3 | Parallel to macroscopic rails | | |
| | | | | | 0.996 | 10.3 | 9.182 |
| | | | | | Vertical to macroscopic rails | | |
| | | | | | 3.17 | 14.272 | 13.016 |

The invention claimed is:

1. A hydrophobic micro- and/or nanostructured surface comprising a plurality of micro-scale and/or nano-scale surface elements and having a static contact angle against water of at least 90°, said surface being essentially unchanged when subjected to 10 rubbing cycles according to A.A.T.C.C. test method 8-1972 using a cotton cloth and a total overlying weight of 300 g, said surface comprising a polymeric material having
1) an elongation at break of at least 10%,
2) an irreversible relative plastic deformation (permanent set) of less than 2% and a
3) a tensile strength of at least 5 MPa,
wherein the polymeric material is obtained by curing a UV- or electron beam curable precursor comprising
a) at least 60 weight % of one or more crosslinkable oligomer and/or polymer compounds selected from a group comprising polyurethanes, polyacrylates, epoxy acrylates, silicone acrylates, and polyether acrylates,
b) 2-40 weight % of one or more reactive diluents selected from a group of UV-curable monomers containing one or more acrylate, methacrylate or vinyl groups,
c) 0.2-5 weight % of one or more hydrophobic additives selected from a group of additives comprising silicones, fluorochemicals and long-chain alkyl compounds, and
d) 0-5 weight % of one or more photoinitiators.

2. Surface according to claim 1 comprising a plurality of micro-scale and, optionally, nano-scale surface elements and having a static contact angle against water of at least 130°.

3. Surface according to claim 1 wherein the polymer material when provided as an unstructured surface has a static contact angle against water of at least 70°.

4. Surface according to claim 1 wherein the hydrophobic additives are selected from a group of additives comprising silicones, fluorochemicals and long-chain alkyl compounds, which contain ethylenically unsaturated groups such as acrylate groups, methacrylate groups or vinyl groups.

5. Surface according to claim 1 wherein the polymeric material comprises one or more additives selected from a group comprising pigments, dyes, colorants, rheology agents, levelling agents, anti-skin agents, UV stabilizers, anti-oxidants, and anti-foam additives.

6. Composite article comprising a surface according to claim 1 wherein the surface is attached to a substrate selected from a group of substrates comprising glass, polymers, metals, wood, concrete, and stone.

7. Method of preparing a hydrophobic micro- and/or nanostructured surface comprising a plurality of micro-scale and/or nano-scale surface elements, said method comprising the steps of (i) providing a tool surface comprising a plurality of micro- and/or nano-structured surface elements forming the negative of the structured surface, and
(ii) replicating the structured surface from the tool surface by applying a UV- or electron beam curable precursor of a polymeric material onto the tool surface, radiation curing the precursor, and removing the replicated structured surface from the tool surface,
wherein the precursor is selected to provide upon curing a polymer material having
1 an elongation at break of at least 10%,
2 an irreversible plastic deformation (permanent set) of less than 2%, and 3 a tensile strength of at least 5 MPa, and wherein the structured surface has a static contact angle against water of at least 90°, said surface being essentially unchanged when subjected to 10 rubbing cycles according to A.A.T.C.C. test method 8-1972 using a cotton cloth and a total overlying weight of 300 g, and wherein the UV- or electron beam curable precursor comprises a) at least 60 weight % of one or more crosslinkable oligomer and/or polymer compounds selected from a group comprising polyurethanes, polyacrylates, epoxy acrylates, silicone acrylates, and polyether acrylates, b) 2-40 weight % of one or more reactive diluents selected from a group of UV-curable monomers containing one or more acrylate, methacrylate or vinyl groups, c) 0.2-5 weight % of one or more hydrophobic additives selected from a group of additives comprising silicones, fluorochemicals and long-chain alkyl compounds, and d) 0-5 weight % of one or more photoinitiators.

8. Method according to claim 7 wherein the UV- or electron beam curable precursor is supplied continuously to the tool surface, and the replicated structured surface is continuously removed from the tool surface.

* * * * *